(12) United States Patent
Mueller et al.

(10) Patent No.: US 7,114,894 B2
(45) Date of Patent: Oct. 3, 2006

(54) KEY CUTTING MACHINE AND METHOD

(75) Inventors: Michael A. Mueller, Phoenix, AZ (US); Warren W. Stansberry, Desert Hills, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 80 days.

(21) Appl. No.: 10/105,187

(22) Filed: Mar. 26, 2002

(65) Prior Publication Data

US 2002/0141843 A1 Oct. 3, 2002

Related U.S. Application Data

(60) Provisional application No. 60/278,432, filed on Mar. 26, 2001.

(51) Int. Cl.
*B23C 3/35* (2006.01)

(52) U.S. Cl. .................... 409/84; 409/82; 409/106; 409/108; 409/197; 409/212; 409/192; 409/213; 409/225; 409/218; 409/134; 409/137; 409/214; 409/210

(58) Field of Classification Search ............ 409/82, 409/83, 81, 84, 132, 106, 108, 192, 197, 409/202, 212, 203, 205, 213, 219, 225, 218, 409/134, 137, 214, 210; 76/110
See application file for complete search history.

(56) References Cited

U.S. PATENT DOCUMENTS

| 2,038,949 | A |   | 4/1936  | Mintz |
|-----------|---|---|---------|-------|
| 3,602,092 | A | * | 8/1971  | Richens ........................ 409/83 |
| 5,096,346 | A | * | 3/1992  | Ueda ........................... 409/203 |
| 5,443,339 | A |   | 8/1995  | Heredia et al. |
| 5,538,374 | A | * | 7/1996  | Cole et al. ..................... 409/83 |
| 5,592,728 | A | * | 1/1997  | Susnjara ....................... 29/434 |
| 5,660,509 | A | * | 8/1997  | Cole et al. ..................... 409/81 |
| 5,676,504 | A |   | 10/1997 | Mueller et al. |
| 5,906,365 | A | * | 5/1999  | Wu ............................. 269/319 |
| 6,543,972 | B1| * | 4/2003  | Cimino ......................... 409/83 |
| 6,588,995 | B1| * | 7/2003  | Wills et al. .................. 409/131 |
| 6,641,339 | B1| * | 11/2003 | Chies et al. ................... 409/81 |

FOREIGN PATENT DOCUMENTS

| EP | 835720 A1 | * | 4/1998 |
| FR | 2 117 833 |   | 7/1972 |
| GB | 2 276 106 |   | 9/1994 |
| JP | 4-250911 A | * | 9/1992 |
| WO | WO 93/06959 |   | 4/1993 |

OTHER PUBLICATIONS

U.S. Appl. No. 09/625,274, filed Jul. 25, 2000.

* cited by examiner

*Primary Examiner*—Erica Cadugan
(74) *Attorney, Agent, or Firm*—Finnegan, Henderson, Farabow, Garrett & Dunner

(57) ABSTRACT

A key cutting machine for cutting a notch pattern on a key blank is disclosed. The key cutting machine comprises a pair of cutting heads and a clamp mechanism. Each cutting head includes a cutting wheel having an edge and an alignment structure mounted behind the cutting wheel. Each alignment structure has a key guide portion aligned tangent to the edge of a corresponding cutting wheel to engage and position a key blank laterally. The clamp mechanism is positioned between the cutting heads and is configured to hold the key blank stationary.

115 Claims, 23 Drawing Sheets

KEY CUTTING MACHINE AND METHOD

RELATED APPLICATIONS

This application claims the benefit of U.S. provisional application No. 60/278,432, filed on Mar. 26, 2001, which is expressly incorporated herein by reference.

BACKGROUND OF THE INVENTION

This invention generally relates to key cutting machines and related methods. More particularly, the present invention relates to a key cutting machine that has improved alignment, clamping, and cutting mechanisms and to a related method for cutting a notch pattern on a key blank.

Key duplication systems exist that cut biting patterns in blank keys by tracing the original key to be duplicated or by using a code or extracting the biting patterns from a database. The former type is more prevalent in consumer outlets and the latter is more prevalent in businesses such as automobile dealers and rental agencies.

But the tracing and code cutting key duplication systems require precise alignment and clamping mechanisms to maintain the ability to accurately cut keys. These issues are rendered more difficult by the use of double-sided keys, which are more common in the automobile industry.

A key cutting machine described in U.S. Pat. No. 5,676,504 utilizes a set of cassettes to address the need for proper alignment and clamping of a key. The cassettes may be selectively inserted into an cassette receiving aperture of the key cutting machine and provide both positional alignment function and clamping function while the key cutting machine cuts a bit notch pattern on a key blank. The key cutting machine described in '504 requires an operator to select different cassettes for different key blanks and different bit notch patterns.

Thus, there exists a need in the art for improved key duplication systems that can readily align and clamp keys, particularly double-sided keys. There is a related need to reduce the space occupied by such machines and to provide a machine with a small "footprint" that can be easily transported. Such machines must be capable of accurately cutting keys of a diverse nature with a low level of miscuts.

SUMMARY OF THE INVENTION

The present invention is directed to an improved key cutting machine and a related method. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

In accordance with the invention, a key cutting machine comprises a pair of cutting heads and a clamp mechanism. Each cutting head includes a cutting wheel having an edge. An alignment structure is mounted behind each cutting wheel. Each alignment structure has a key guide portion aligned tangent to the edge of a corresponding cutting wheel to engage and position a key blank laterally. The clamp mechanism is positioned between the cutting heads and is configured to hold the key blank stationary.

In another aspect, the invention is directed to a key cutting machine for cutting a notch pattern on a key blank. The key cutting machine comprises a housing and a pair of cutting heads. The housing includes a top frame and a base. The cutting heads are suspended below the top frame of the housing without being supported on the base of the housing. Each cutting head includes a cutting wheel rotatable to cut the notch pattern on the key blank.

In yet another aspect, the invention is directed to a key cutting machine for cutting a notch pattern on a key blank. The key cutting machine comprises a housing, a pair of cutting heads, and a clamp mechanism. The housing includes a top frame. The cutting heads are positioned within the housing. Each cutting head includes a cutting wheel rotatable to cut the notch pattern on the key blank. The clamp mechanism is positioned between the cutting heads. The clamp mechanism includes a lower clamp and an upper clamp. The upper clamp is suspended from the top frame of the housing and is vertically movable relative to the lower clamp to hold the key blank stationary.

In yet another aspect, the invention is directed to a key cutting machine for cutting a notch pattern on a key blank. The key cutting machine comprises a clamp mechanism, a tip stop mechanism, and a pair of cutting heads. The clamp mechanism is configured to hold the key blank stationary. The tip stop mechanism is positioned behind the clamp mechanism and is configured to engage a tip of the key blank and position the key blank longitudinally. The cutting heads are movable relative to the clamp mechanism. The cutting heads are movable longitudinally in unison and are movable independently of each other laterally. Each cutting head includes a cutting wheel rotatable to cut the notch pattern on the key blank.

In yet another aspect, the invention is directed to a method for cutting a notch pattern on a key blank using a key cutting machine. The key cutting machine includes a clamp mechanism, a tip stop, and a pair of cutting heads. Each cutting head includes a cutting wheel and a paddle mounted behind the cutting wheel. The method comprises the steps of: moving the cutting heads laterally to position the paddles at correct lateral positions spaced apart from each other by a width of the key blank; inserting the key blank into the clamp mechanism; positioning the key blank laterally by engaging the key blank with the paddles; engaging a tip of the key blank with the tip stop; positioning the key blank at a correct longitudinal position by moving the tip stop longitudinally; clamping the key blank stationary using the clamp mechanism; and moving at least one of the cutting heads relative to the clamp mechanism to cut the notch pattern on the key blank.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF THE DRAWINGS

The accompanying drawings, which are incorporated in and constitute a part of this specification, illustrate embodiments of the invention and together with the description, serve to explain the principles of the invention. In the drawings.

DETAILED DESCRIPTION

Reference will now be made in detail to the presently preferred embodiment of the present invention, examples of which are illustrated in the accompanying drawings. Wherever possible, the same reference numbers will be used throughout the drawings to refer to the same or like parts. An exemplary embodiment of a key cutting machine of the present invention is designated generally by reference number 20.

Figure 1:
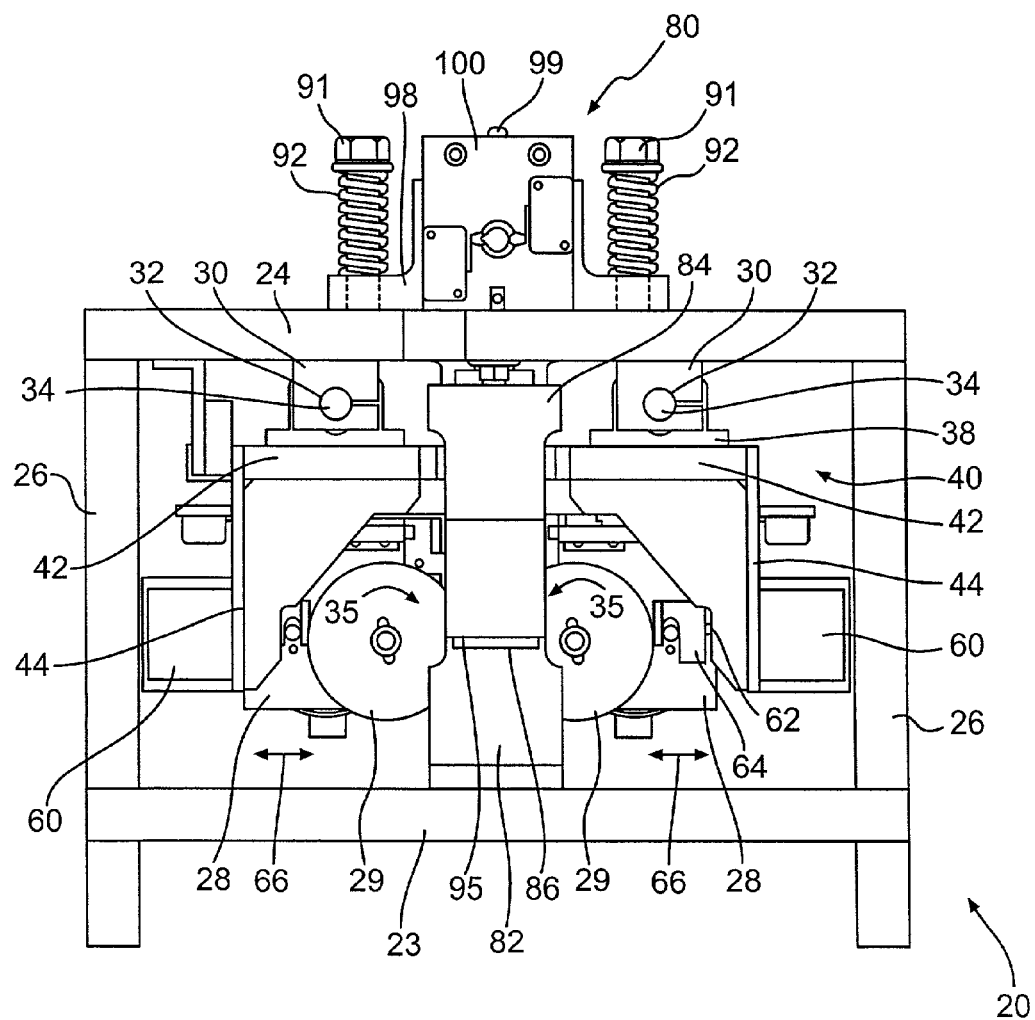
FIG. 1 is a front view of an embodiment of a key cutting machine according to the present invention.
Figure 2:
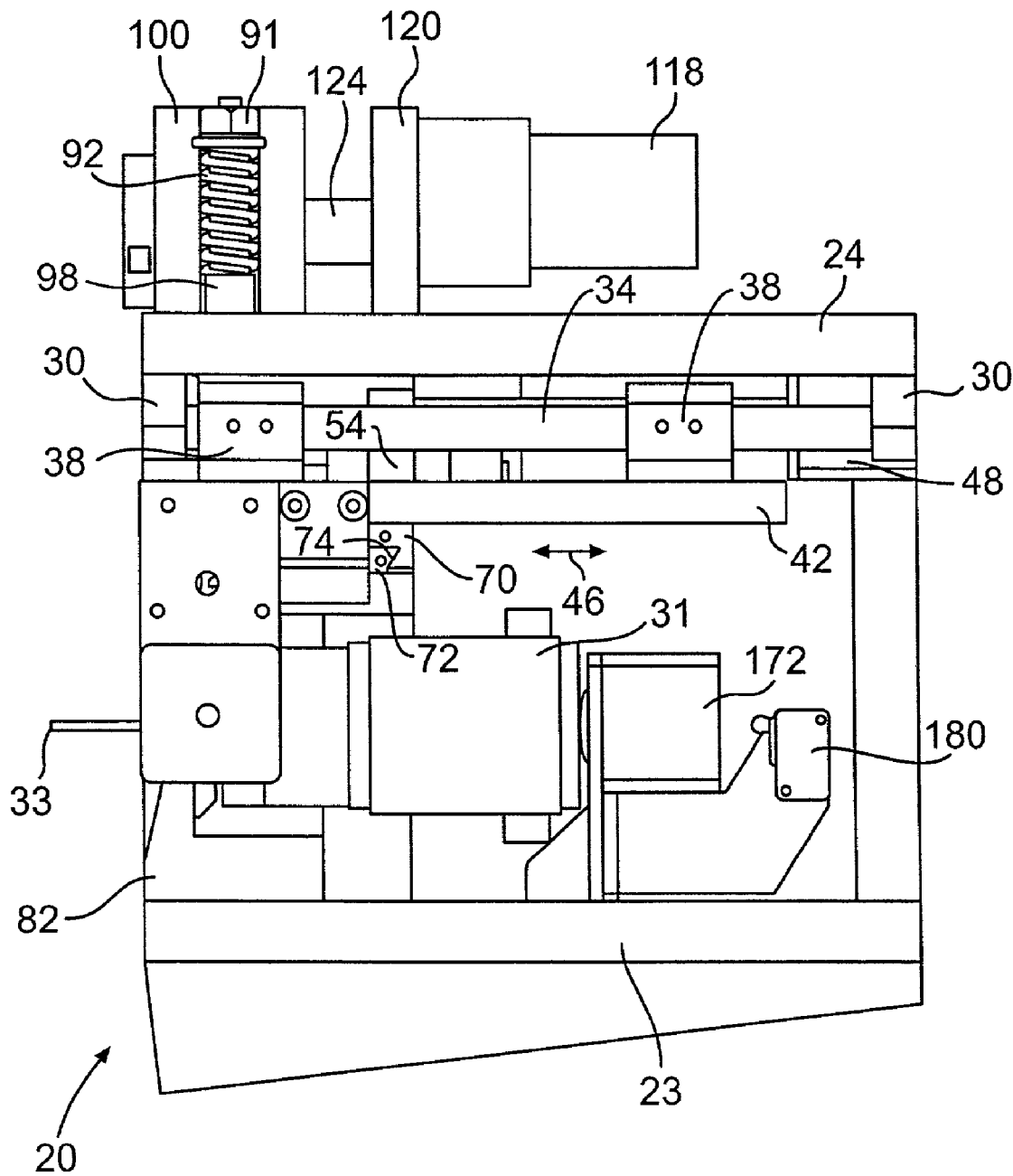
FIG. 2 is a side view of the key cutting machine of FIG. 1.
Figure 15:
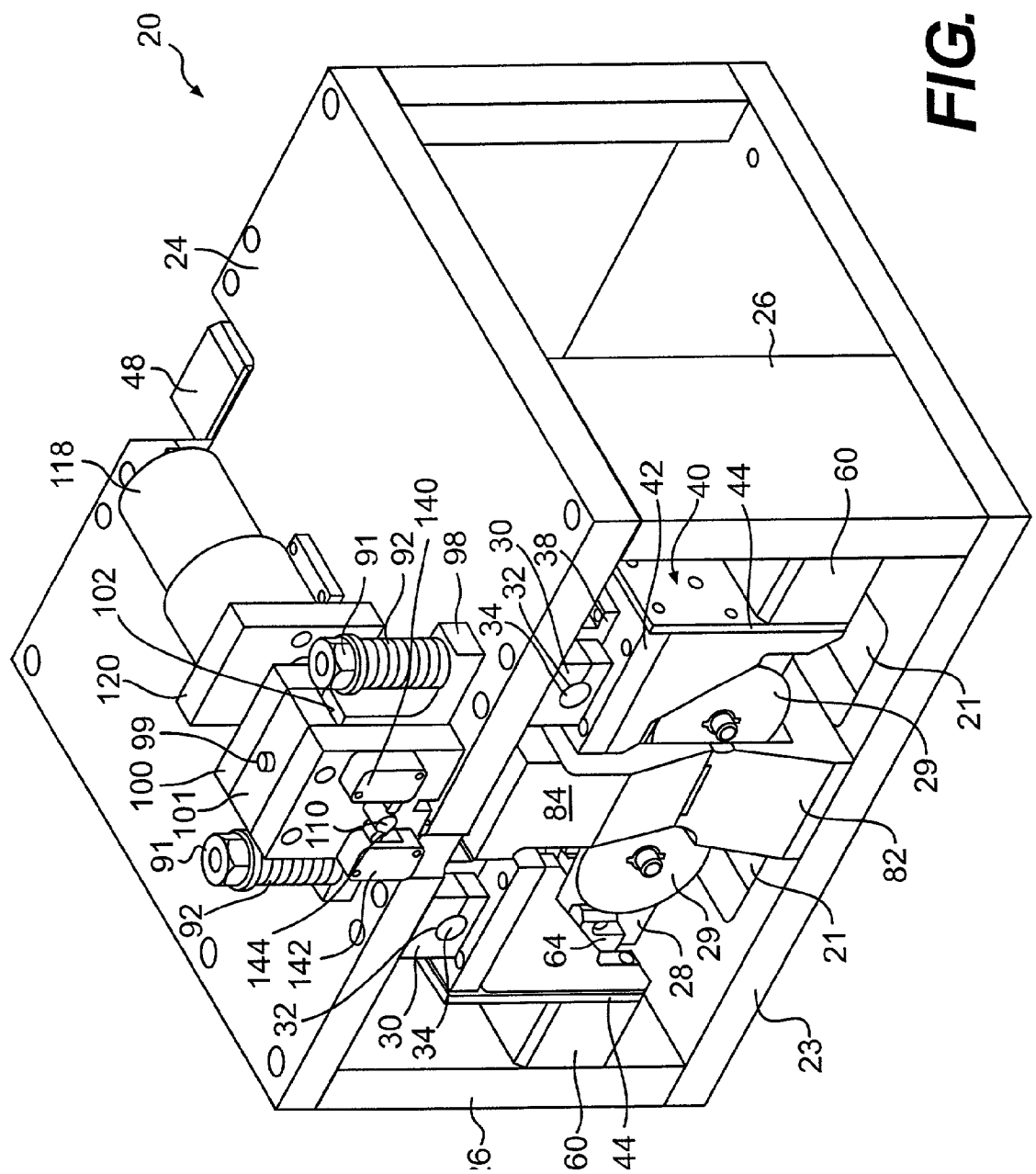
FIG. 15 is a perspective view of a key cutting machine according to the present invention.

As illustrated in FIGS. 1, 2, and 15, key cutting machine 20 includes a housing having a top frame 24 that is supported by a pair of side frames 26. A pair of suspension blocks 30 are connected to the front of top frame 24 and a pair of suspension blocks 30 are connected to the back of top frame 24. Each suspension block 30 includes an opening 32 to receive and hold a guide rail 34.

Figure 5:
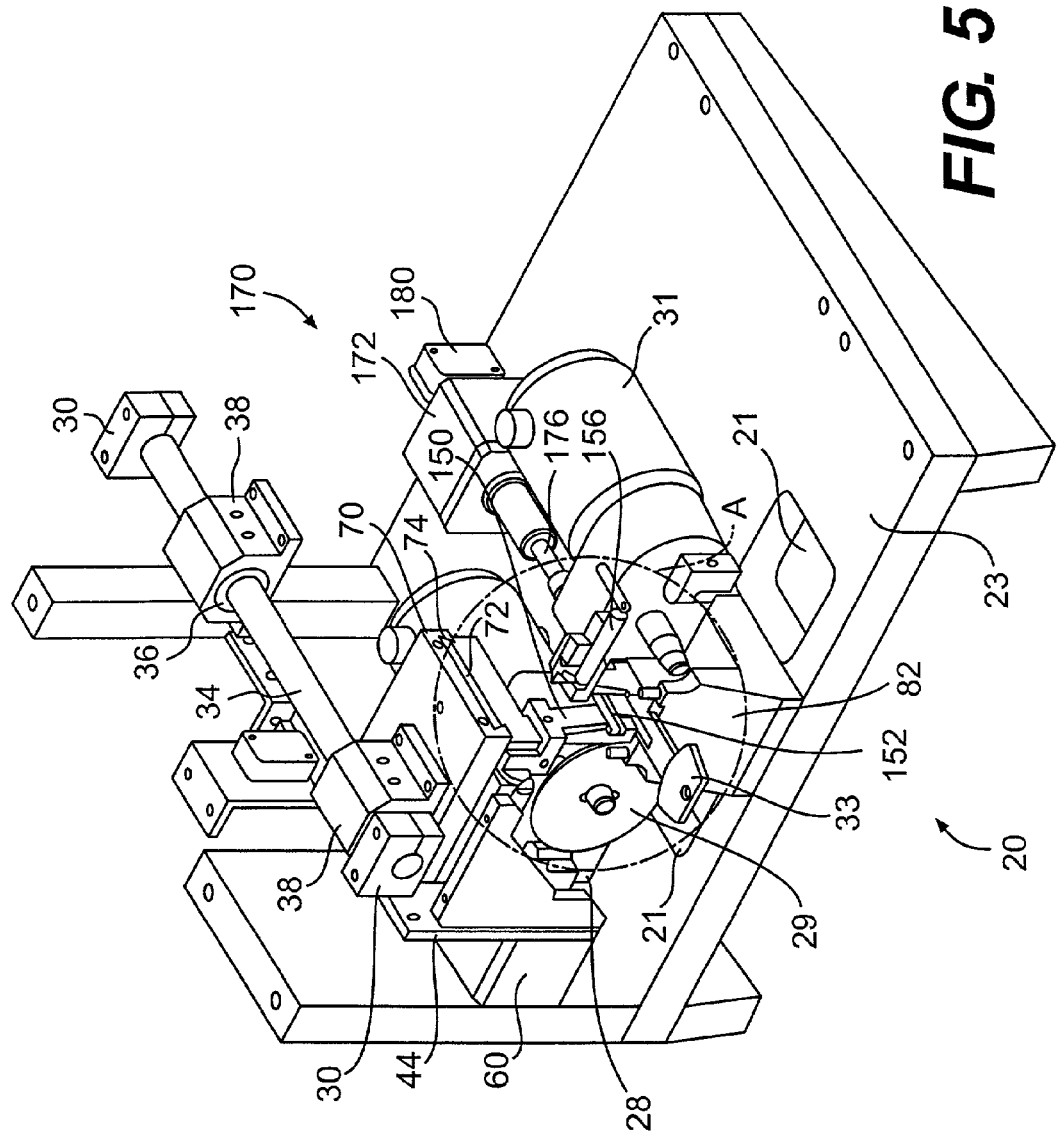
FIG. 5 is a partial perspective view of a key cutting machine according to the present invention illustrating alignment paddles pivotally mounted to cutting heads.
Figure 16:
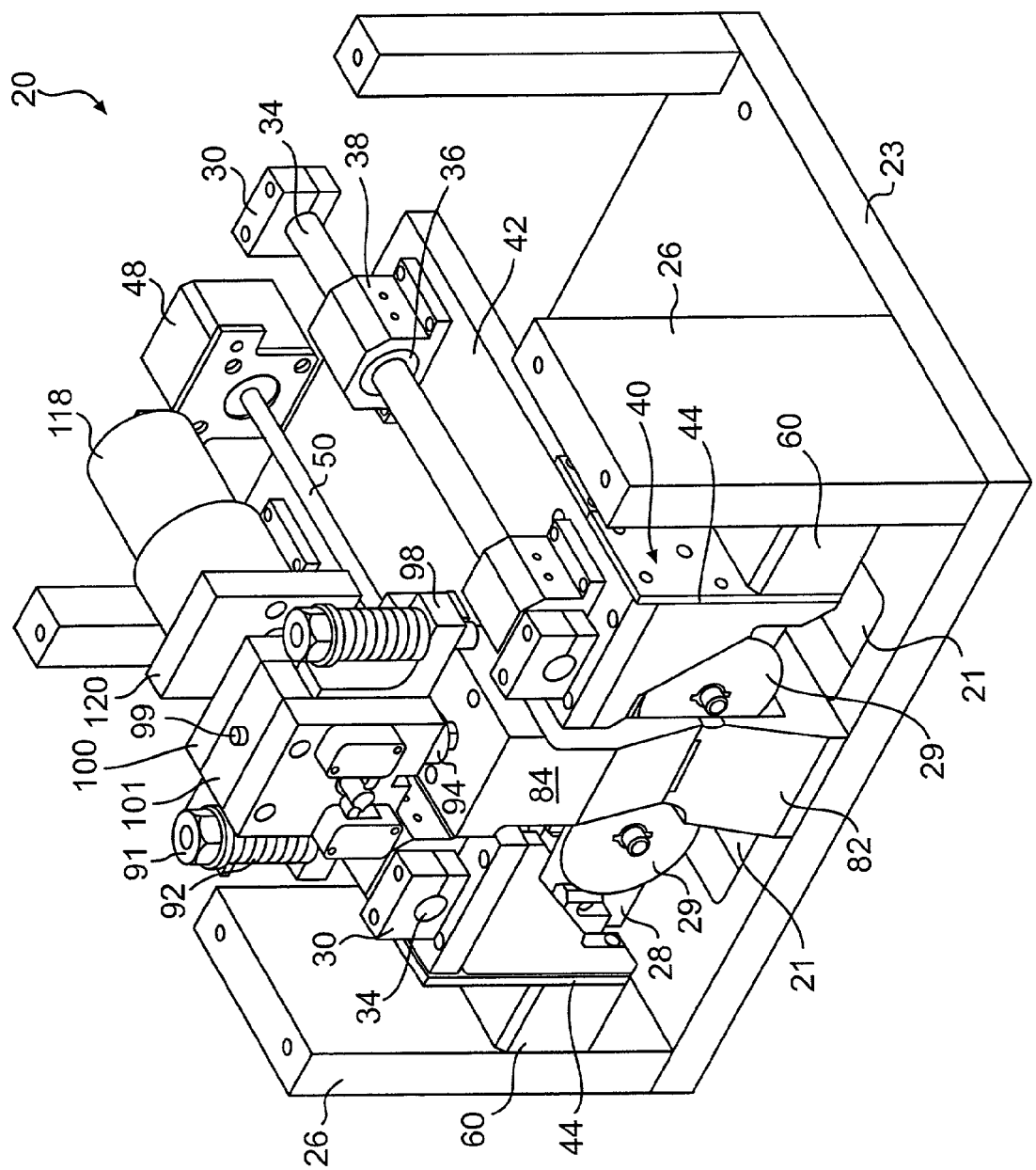
FIG. 16 is a partial perspective view of a key cutting machine according to the present invention where a top frame is removed from FIG. 15.
Figure 17:
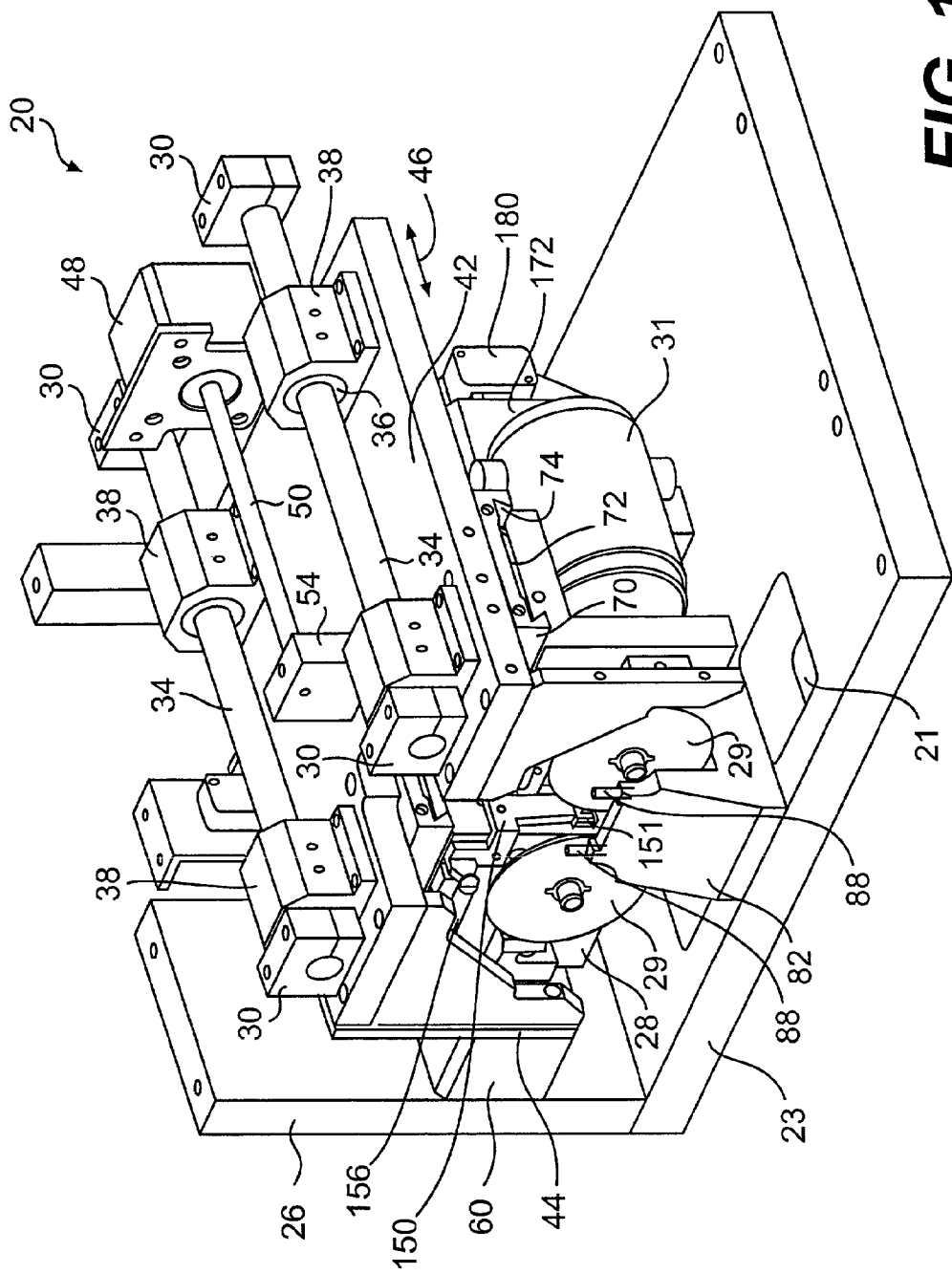
FIG. 17 is a partial perspective view of a key cutting machine according to the present invention illustrating linear bearings and a top portion of a suspension bracket.

A pair of linear bearings 36, each supported by bearing support 38, are slidably mounted on each guide rail 34 (FIGS. 5, 16, and 17). Bearing supports 38 are mounted to a carriage or suspension bracket 40 at the top portion 42 thereof (FIGS. 1 and 14–17).

A pair of cutting heads 28 are suspended from top portion 42 of suspension bracket 40. Each cutting head 28 includes a cutting wheel 29 rotated by a drive motor 31 for cutting a notch pattern on a key blank 33.

As described above, cutting heads 28 are suspended below linear bearings 36. As a result, the possibility of cutting chips falling on and contaminating linear bearings 36, or any other moving parts of key cutting machine 20, is reduced. In addition, top portion 42 of suspension bracket 40 prevents cutting chips from reaching linear bearings 36 and thereby further reduces the possibility of contamination. Moreover, drive motors 31 preferably rotate cutting wheels 29 in the directions designated by reference number 35 to direct the majority of cutting chips toward a base 23 of key cutting machine 20 and away from linear bearings 36 and other cutting components. Preferably, base 23 includes openings 21 (FIGS. 5 and 15–18) for cutting chips to fall through. A tray (not shown) may be positioned below openings 21 to collect cutting chips.

Figure 4:
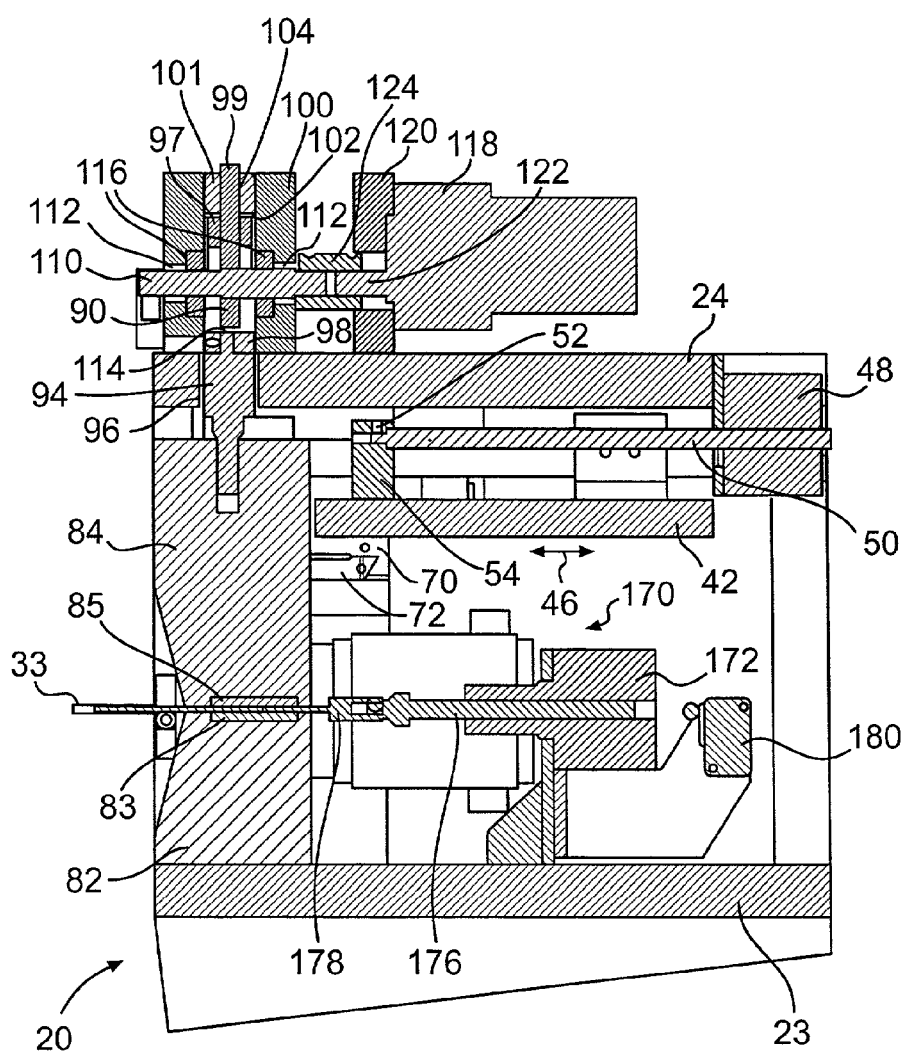
FIG. 4 is a section view of a key cutting machine taken along line B—B of FIG. 3 illustrating a clamp mechanism and a tip stop mechanism.

As mentioned above, both cutting heads 28 are suspended from top portion 42 of suspension bracket 40. In other words, top portion 42 of suspension bracket 40 is common to both cutting heads 28. Accordingly, both cutting heads 28 move longitudinally in unison as suspension bracket 40 moves along guide rails 34 in longitudinal directions designated by reference number 46 (FIGS. 2, 4, and 17).

A stepper motor 48 controls the longitudinal movement of cutting heads 28. As shown in FIGS. 4 and 15, stepper motor 48 is suspended from top frame 24. A threaded shaft 50 extends through stepper motor 48 and one end thereof is connected to a block 54 supported on the upper surface of top portion 42 of suspension bracket 40. As illustrated in FIG. 4, a pin 52 connects threaded shaft 50 to block 54. However, other known techniques may be used to connect threaded shaft 50 to block 54. As the motor armature (not shown) of stepper motor 48 rotates in a first direction, threaded shaft 50 moves toward the back of key cutting machine 20 and carries with it suspension bracket 40. Consequently, both cutting heads 28 move longitudinally in unison toward the back of key cutting machine 20. Similarly, both cutting heads 28 move in unison toward the front of key cutting machine 20 as the motor armature of stepper motor 48 rotates in a second direction opposite to the first direction.

While both cutting heads 28 move longitudinally in unison, their lateral movements are controlled independently. As shown in FIGS. 2, 4, 5, 6, and 17, each cutting head 28 has a dove-tail shaped projection 72 protruding from the top surface thereof. Dove-tail shaped projection 72 of each cutting head 28 slidably engages a correspondingly-shaped groove 74 formed in a block 70 suspended from top portion 42 of suspension bracket 40. It should be noted that FIG. 5 omits top portion 42 of suspension bracket 40 in order to show a tip stop mechanism 170 explained in greater detail below.

In addition to dove-tail shaped projections 72 and grooves 74, the present invention contemplates the use of different shapes for projections 72 and grooves 74. Moreover, instead of projections 72 and grooves 74 provided, respectively, on cutting heads 28 and blocks 70, the present invention contemplates the use of grooves 74 on cutting heads 28 and corresponding projections 72 on blocks 70.

To move each cutting head 28 in lateral directions designated by reference number 66 (FIG. 1), a stepper motor 60 is mounted to each side portion 44 of suspension bracket 40. Accordingly, stepper motor 60 moves longitudinally with suspension bracket 40 as indicated by arrow 46 in FIG. 2. A threaded shaft 62 (FIGS. 7 and 14) extends through side portion 44 of suspension bracket 40 and is connected to a block 64 protruding from the front surface of each cutting head 28. Similar to threaded shaft 50, threaded shaft 62 moves linearly as the motor armature (not shown) of stepper motor 60 rotates in first and second directions. Through the connection to block 64, threaded shaft 62 pushes or pulls cutting head 28. In response to the linear movements of threaded shaft 62, cutting head 28 moves by sliding dove-tail shaped projection 72 in groove 74.

Figure 6:
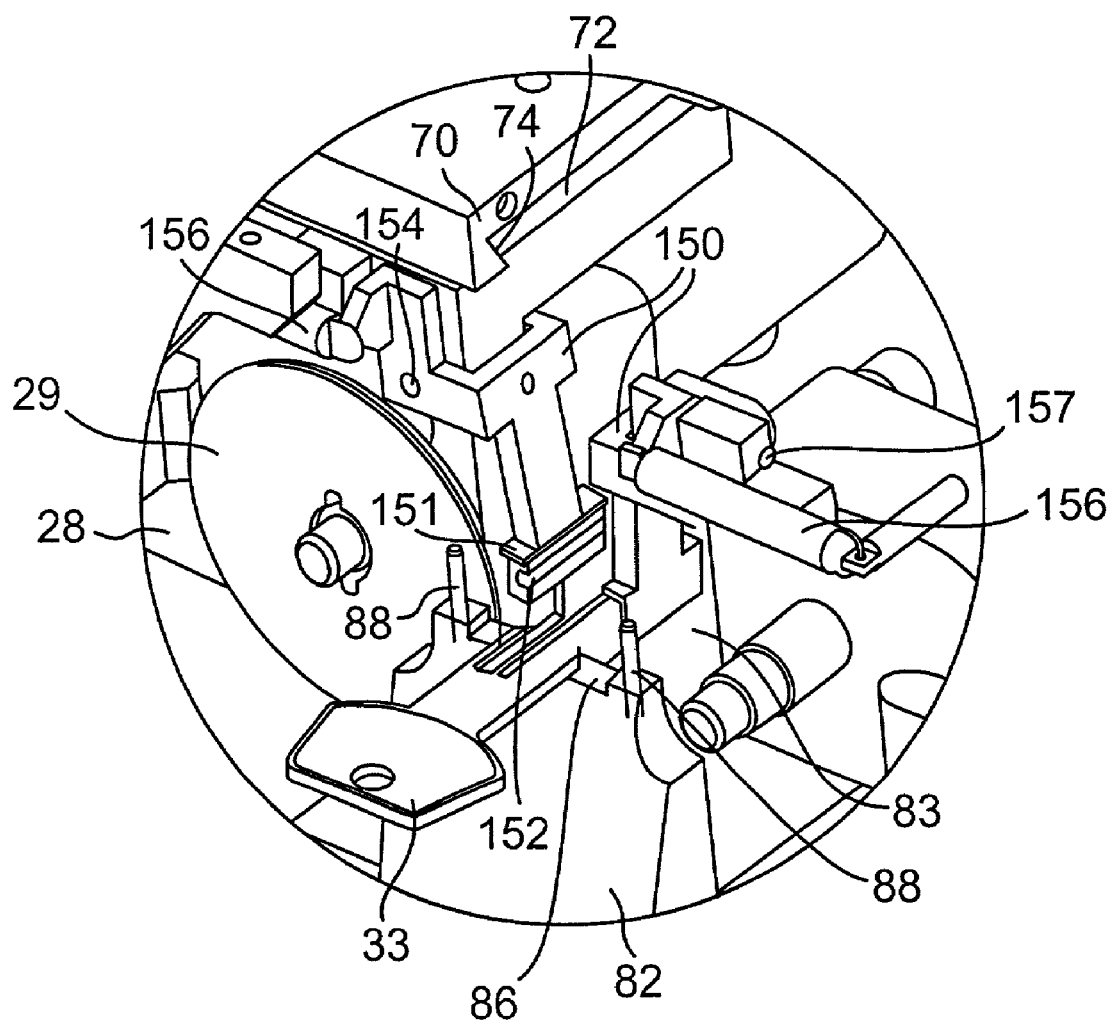
FIG. 6 is an enlarged perspective view of the portion of a key cutting machine enclosed in circle A of FIG. 5.

While cutting heads 28 move longitudinally and laterally to cut a desired notch pattern on key blank 33, a clamp mechanism 80 holds key blank 33 stationary. Clamp mechanism 80 includes a lower clamp or anvil 82 and an upper clamp 84. Anvil 82 is supported on base 23 and includes a recess 86 formed on the top portion thereof as shown in FIG. 6. Anvil 82 further includes a pair of pins 88 protruding from the top portion thereof toward top frame 24. Upper clamp 84 includes a pair of holes (not shown) that correspond to and engage pins 88. Upper clamp 84 is movable vertically to and away from anvil 82. Pins 88 ensure upper clamp 84 moves in a substantially vertical direction.

Figure 11:
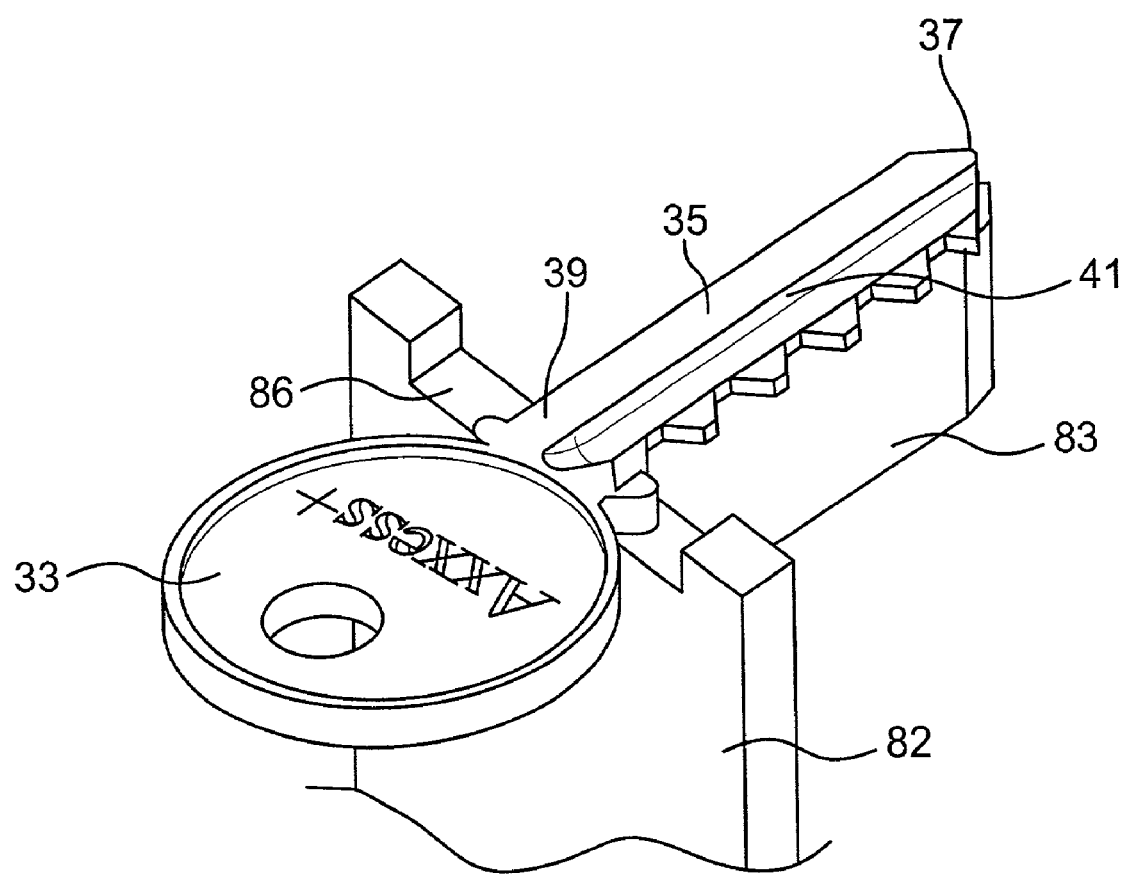
FIG. 11 is a perspective view of a key and an anvil.
Figure 18:
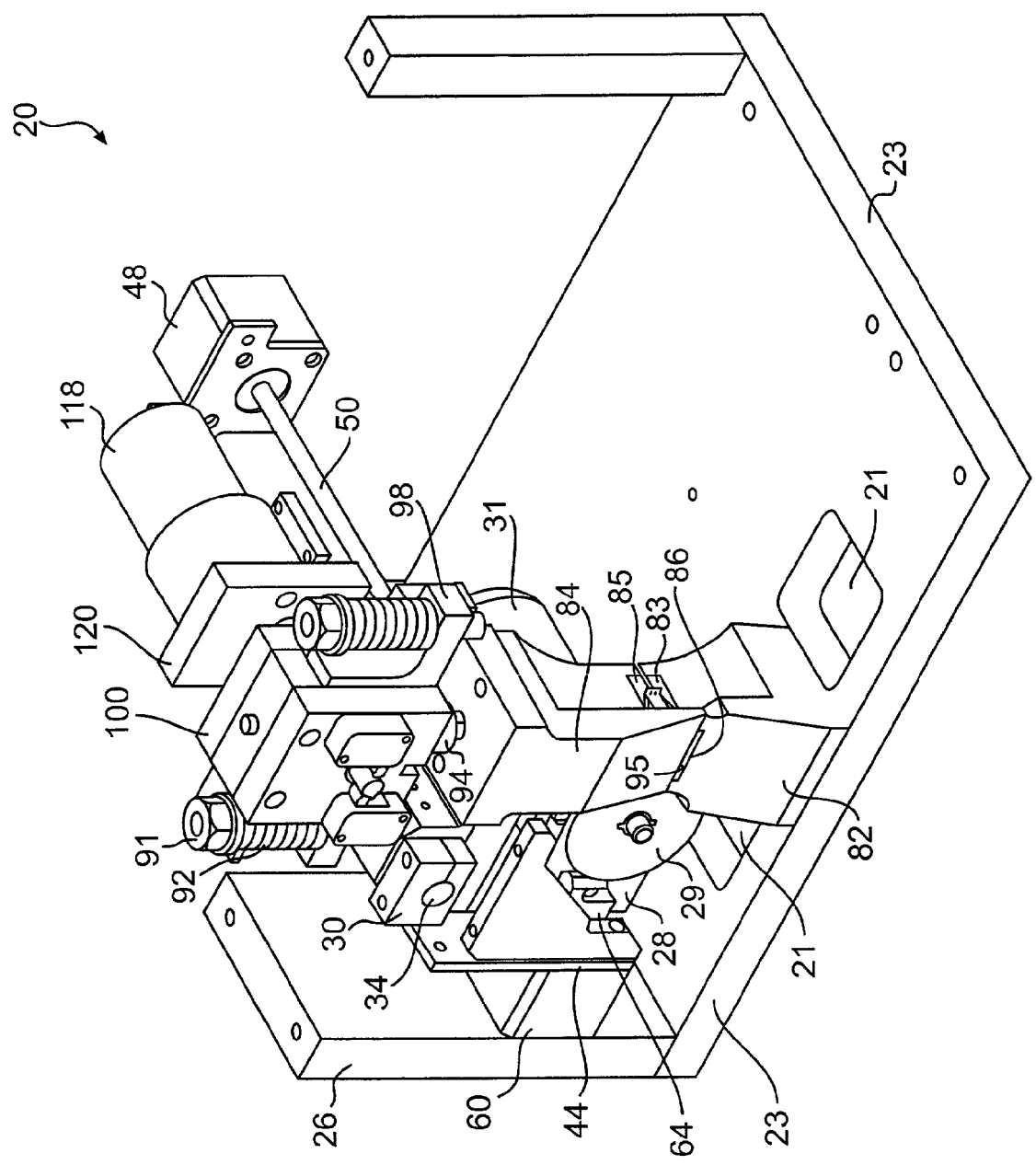
FIG. 18 is a partial perspective view of a key cutting machine according to the present invention illustrating an upper clamp and an anvil.
Figure 19:
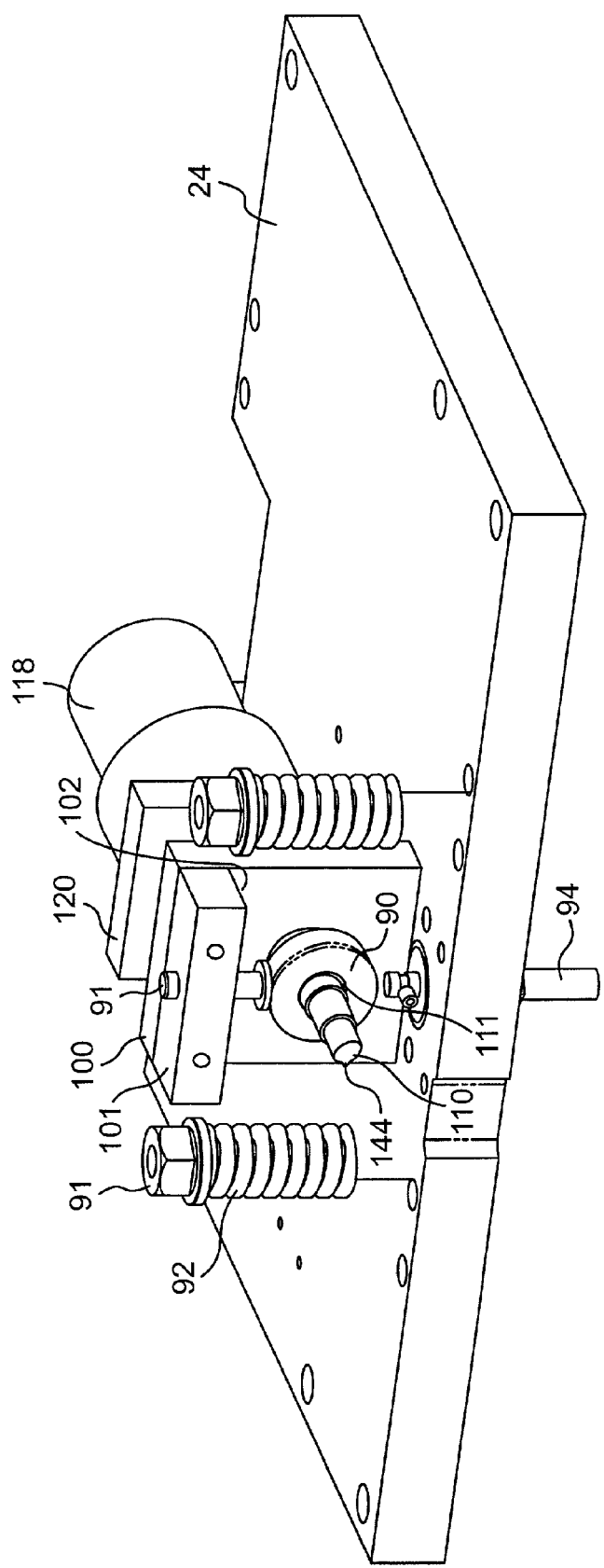
FIG. 19 is a partial perspective view of the top of a clamp mechanism illustrating a shaft and a cam.
Figure 20:
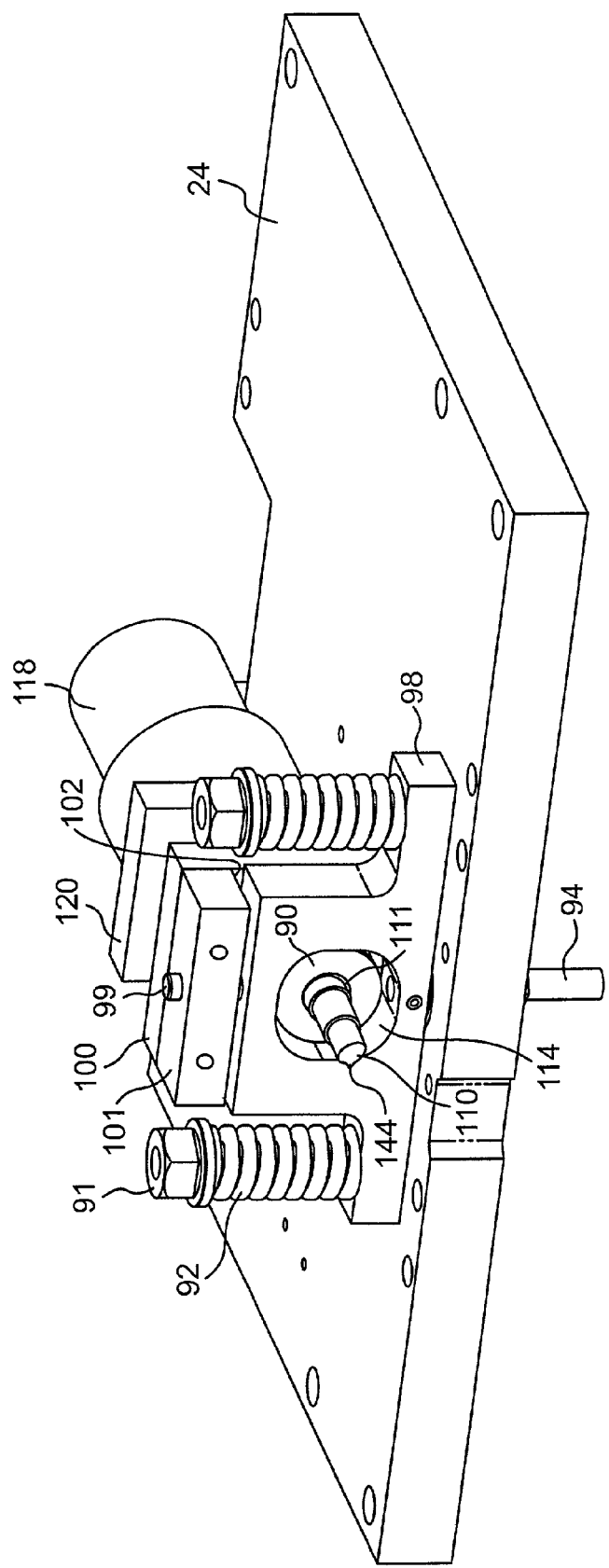
FIG. 20 is a partial perspective view of the top of a clamp mechanism illustrating a block biased by springs.

As illustrated in FIGS. 4, 11 and 18, anvil 82 includes an elongated portion 83 configured to support a blade portion 35 of key blank 33. Elongated portion 83 is positioned at the lateral center of anvil 82 behind recess 86. Elongated portion 83 has a length to support the entire length of blade portion 35 of key blank 33 and a width narrower than the width of blade portion 35 of key blank 33. The top of elongated portion 83 is coplanar with the bottom of recess 86. Similarly, upper clamp 84 includes a corresponding elongated portion 85 (FIGS. 4 and 18) configured to press down on blade portion 35 of key blank 33. Elongated portions 83 and 85 provide support for the cutting area of blade portion 35 to minimize the rotational leverage (i.e., torque) applied to key blank 33 by cutting wheels 29. Preferably, clamping mechanism 80 does not engage the handle of key blank 33. Thus, the clamp does not have to account for keys where the handle thickness is different than the blade thickness, as is the case with plastic handled key.

As illustrated in FIG. 11, the bottom of recess 86 and elongated portion 83 combine to form a T-shaped supporting surface. Similarly, the bottom surface 95 (FIGS. 1 and 18) of upper clamp 84 and elongated portion 85 combine to form a T-shaped pressing surface. The bottom of recess 86 and the bottom surface 95 of upper clamp 84 are configured to support and press the entire width of a shank portion 39 of key blank 33. By supporting and pressing the entire width of shank portion 39, the bottom of recess 86 and the bottom surface 95 prevent key blank 33 from tilting even if elongated portions 83 and 85 engage a groove 41 or other uneven milling surfaces.

To move upper clamp 84 to and away from anvil 82, clamp mechanism 80 utilizes a cam 90 and springs 92. As illustrated in FIGS. 3, 4, 15, 19, and 20, clamp mechanism 80 include a support block 100 secured to top frame 24 and a block 98 shaped like an upside down T. Support block 100 includes an elongated recess 102 and a hole 104 extending through the top portion 101 thereof. Block 98 includes a pin protruding from the top portion 97 thereof. Block 98 is positioned in elongated recess 102 of support block 100. The height of elongated recess 102 is greater than that of block 98 so that block 98 is movable vertically between top portion 101 of support block 100 and the upper surface of top frame 24. Pin 99 received through hole 104 of support block 100 guides the vertical movements of block 98.

Figure 3:
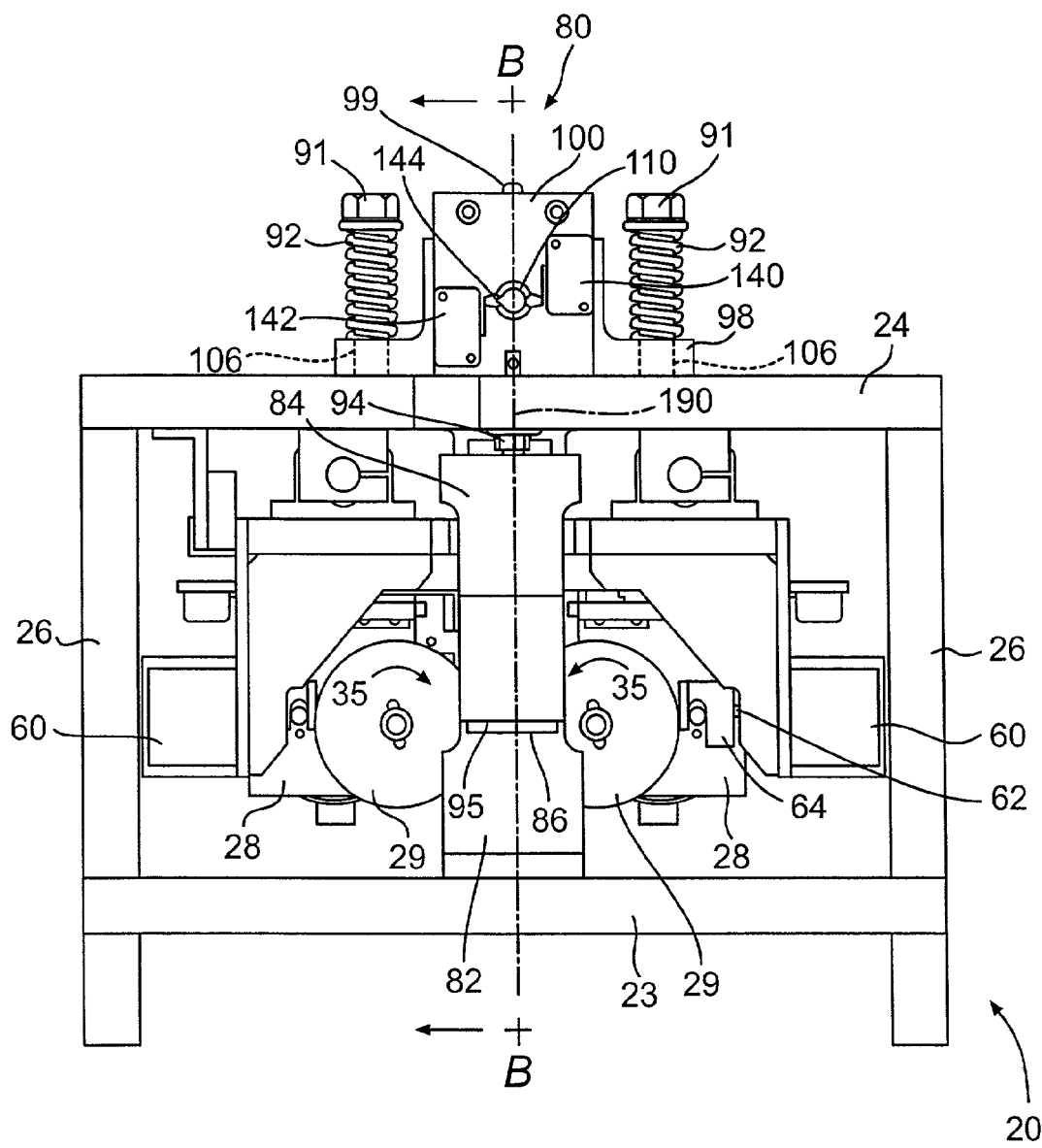
FIG. 3 is a front view of a key cutting machine as shown in FIG. 1 illustrating a vertical center line.

As illustrated in FIG. 3, block 98 includes holes 106 configured to receive bolts 91 therethrough. Bolts 91 received though holes 106 of block 98 are secured to top frame 24. Block 98 is connected to a clamp screw 94 extending through a hole 96 in top frame 24. Clamp screw 94 in turn is connected to upper clamp 84. Springs 92, secured by bolts 91, exert a downward biasing force on block 98, and therefore, on clamp screw 94. The spring force acts on block 98 to move upper clamp 84 toward anvil 82 and into a closed position. Depending on the thickness of key blank 33, the precise position of the bottom surface 95 of upper clamp 84 in a closed position varies. Springs 92, however, provides a sufficient downward force to hold key blank 33 stationary regardless of the precise position of the bottom surface 95 of upper clamp 84.

To overcome the downward biasing force of springs 92 and to move upper clamp 84 upward to an open position, clamp mechanism 80 utilizes cam 90 and a shaft 110. Shaft 110 extends parallel to top frame 24 through holes 112 of support block 100 and a hole 114 of block 98. Bearings 116 mounted in holes 112 of support block 100 rotatably support shaft 110. Shaft 110 is rotated by a DC motor 118. DC motor 118 is mounted to a block 120 extending from top frame 24 and includes a rotary shaft 122 coupled to shaft 110 by a coupler 124.

Figure 9:
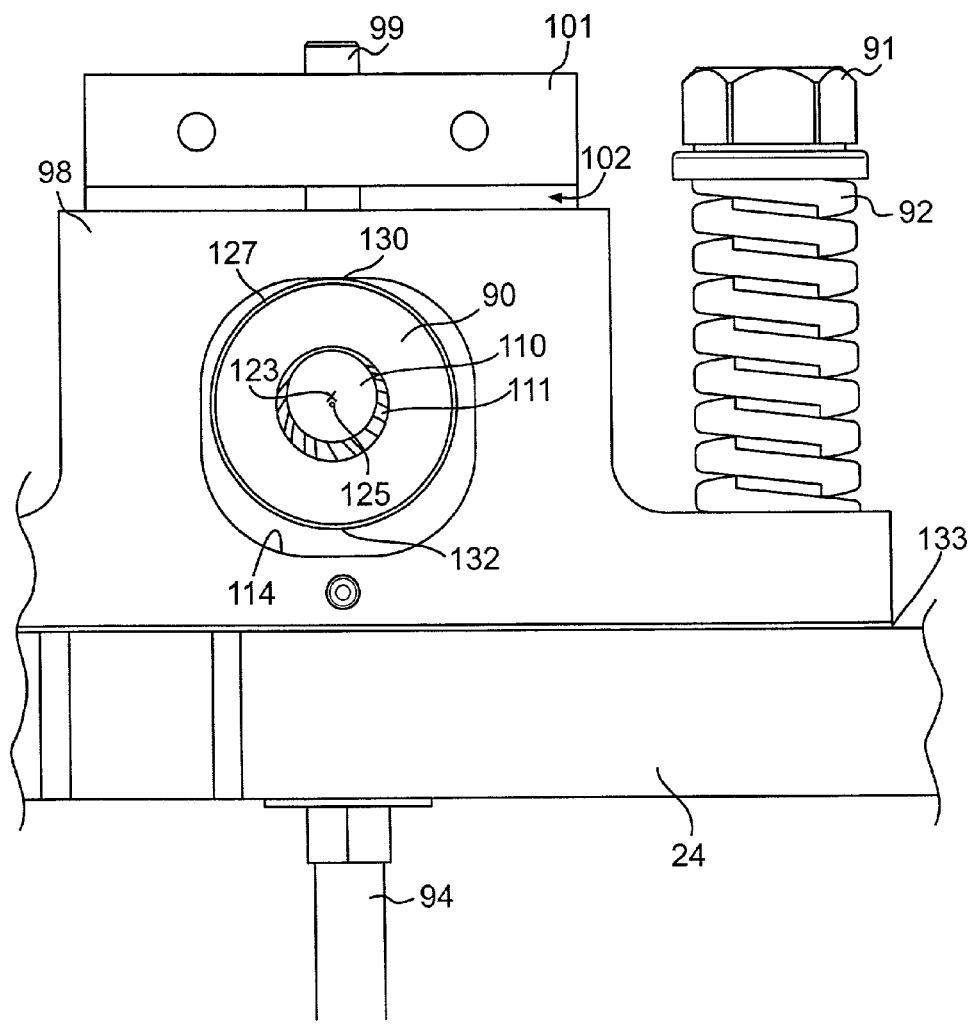
FIG. 9 is a partial front view of the top of a clamp mechanism illustrating a closed position of the clamp.
Figure 10:
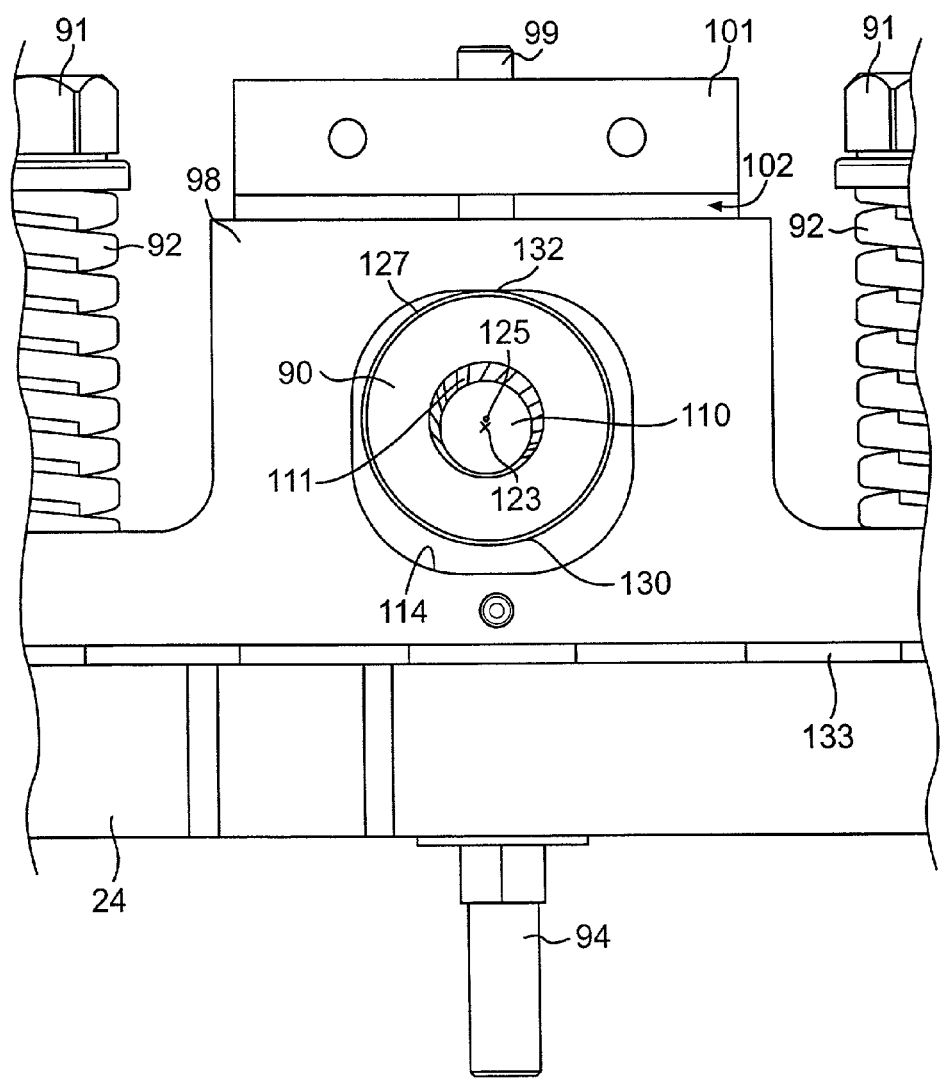
FIG. 10 is a partial front view of a clamp mechanism illustrating an open position of the clamp.

As illustrated in FIGS. 9 and 10, cam 90 is mounted on an eccentric portion 111 of shaft 110 and rotates with shaft 110. Cam 90 is press-fitted onto eccentric portion 111 of shaft 110 so that the center 125 of cam 90 is offset from the rotational axis 123 of shaft 110. Accordingly, a portion 132 is positioned farther away from rotational axis 123 of shaft 110 than a portion 130. Preferably, cam 90 includes a roller bearing 127 so that it rolls rather than slides against the inner surface of opening 114. When DC motor 118 rotates shaft 110 one hundred eighty degrees from an open position, as illustrated in FIG. 10, to a closed position, as illustrated in FIG. 9, portion 132 of cam 90 disengages the upper surface of opening 114. The downward biasing force exerted by springs 92 then moves block 98 toward the upper surface of top frame 24. As block 98 moves toward the upper surface of top frame 24, it transmits the downward biasing force exerted by springs 92 to clamp screw 94. Clamp screw 94 in turn transmits the downward force exerted by springs 92 to upper clamp 84 to hold key blank 33. As mentioned above, however, the precise position of the bottom surface 95 of upper clamp 84 in a closed position depends on the thickness of key blank 33. Accordingly, when upper clamp 84 is in a closed position, the size of a gap 133 developed between the bottom surface of block 98 and the upper surface of top frame 24 varies depending on the thickness of key blank 33.

On the other hand, when DC motor 118 rotates shaft 110 one hundred eighty degrees from a closed position, as illustrated in FIG. 9, to the open position, as illustrated in FIG. 10, portion 132 of cam 90 contacts the upper surface of opening 114. The contact between portion 132 of cam 90 and the upper surface of opening 114 then overcomes the downward biasing force exerted by springs 92 and moves block 98 toward upper portion 101 of supporting block 100. As block 98 moves toward upper portion 101 of support block 100, it pulls clamp screw 94 upward. Clamp screw 94 in turn pulls upper clamp 84 upward to release key blank 33.

Preferably, cam 90 is circular in shape. However, cam 90 may assume many different shapes, including but not limited to ellipses, ovals, or any combination thereof, as long as the distances between rotational axis 123 of shaft 110 and portions 130 and 132 are different. Alternatively, instead of eccentric portion 111, shaft 110 itself may provide the necessary eccentricity. For example, the portion of shaft 110 positioned within opening 114 of block 98 may be offset from the rotational axis 123 of shaft 110 to provide the necessary eccentricity.

Two position switches 140 and 142 (FIGS. 3 and 15) mounted on the front surface of support block 100 control the rotation of DC motor 118 between the open and closed positions. When shaft 110 reaches the closed position, it activates position switch 140 and stops DC motor 118. Similarly, when shaft 110 reaches the open position, it activates position switch 142 and stops DC motor 118. Two position switches 140 and 142 are spaced apart from each other by one hundred eighty degrees. To selectively activate one of two switches 140 and 142, the front end of shaft 110 protruding from the front surface of support block 100 includes a projection 144. Projection 144 will rotate into engagement with one of the two position switches after each 180° of rotation.

As described above, no component of clamp mechanism 80, except for anvil 82, is supported on base 23. The present invention, however, contemplates an alternative clamp mechanism where every component, including an anvil, is suspended from the top of key cutting machine 20. In one embodiment of an alternative clamp mechanism, an anvil having a hollow portion may be suspended from top frame 24 and upper clamp 84 described above may move vertically within the hollow portion. By suspending the anvil, key cutting machine 20 eliminates the need for base 23 and further reduces the possibility of cutting chips pilling up and contaminating components of key cutting machine 20.

To laterally position key blank 33, each key cutting head 28 includes an alignment structure or a paddle 150, as illustrated in FIGS. 5, 6, and 17. Each paddle 150 includes a key guide portion 151 having a groove 152. Groove 152 of key guide portion 151 is positioned to be coplanar with the bottom of recess 86 so that it engages a side edge of blade portion 35 of key blank 33. Furthermore, a pin 154 pivotally mounts paddle 150 to cutting head 28 and a spring 156 biases key guide portion 151 of paddle 150 away from the rotational axis of cutting wheel 29. An adjustment screw 157 mounted on each cutting head 28 adjusts the precise lateral position of key guide portion 151 with respect to the rotational axis of cutting wheel 29.

Accordingly, when stepper motors 60 laterally position cutting heads 28 so that the distance between key guide portions 151 of paddles 150 correspond to the width of blade portion 35 of key blank 33, grooves 152 engage and guide key blank 33 into a correct lateral position. Furthermore, springs 126 automatically correct any deviation from the correct lateral position. It should be noted that FIGS. 5 and 6 show groove 152 of key guide portion 151 above key blank 33 solely for the purpose of illustrating the construction details of paddle 150. As described above, groove 152 is coplanar with the bottom of recess 86 unlike its position shown in FIGS. 5 and 6.

Key guide portion 151 of paddle 150 is positioned slightly behind cutting wheel 29 and is aligned tangent to the edge of cutting wheel 29 by adjustment screw 157. From this aligned position, key guide portion 151 is movable to the rotational axis of cutting wheel 29 behind cutting wheel 29 and never contacts the edge of cutting wheel 29. As cutting head 28 moves laterally toward key blank 33, key guide portion 151 collapses back toward the rotational axis of cutting wheel 29 and overcomes the biasing force exerted by spring 156. Therefore, key guide portion 151 of paddle 150 pivots around pin 154 and moves toward the rotational axis of cutting wheel 29 behind the edge of cutting wheel 29. As a result, the edge of cutting wheel 29 contacts and cuts a side edge of blade portion 35 slightly in front of key guide portion 151 of paddle 150. On the other hand, as cutting head 28 moves laterally away from key blank 33, key guide portion 151 pivots away from the rotational axis of cutting wheel 29 toward key blank 33 by the biasing force exerted by spring 156 until it again is aligned tangent to the edge of cutting wheel 29.

Figure 7:
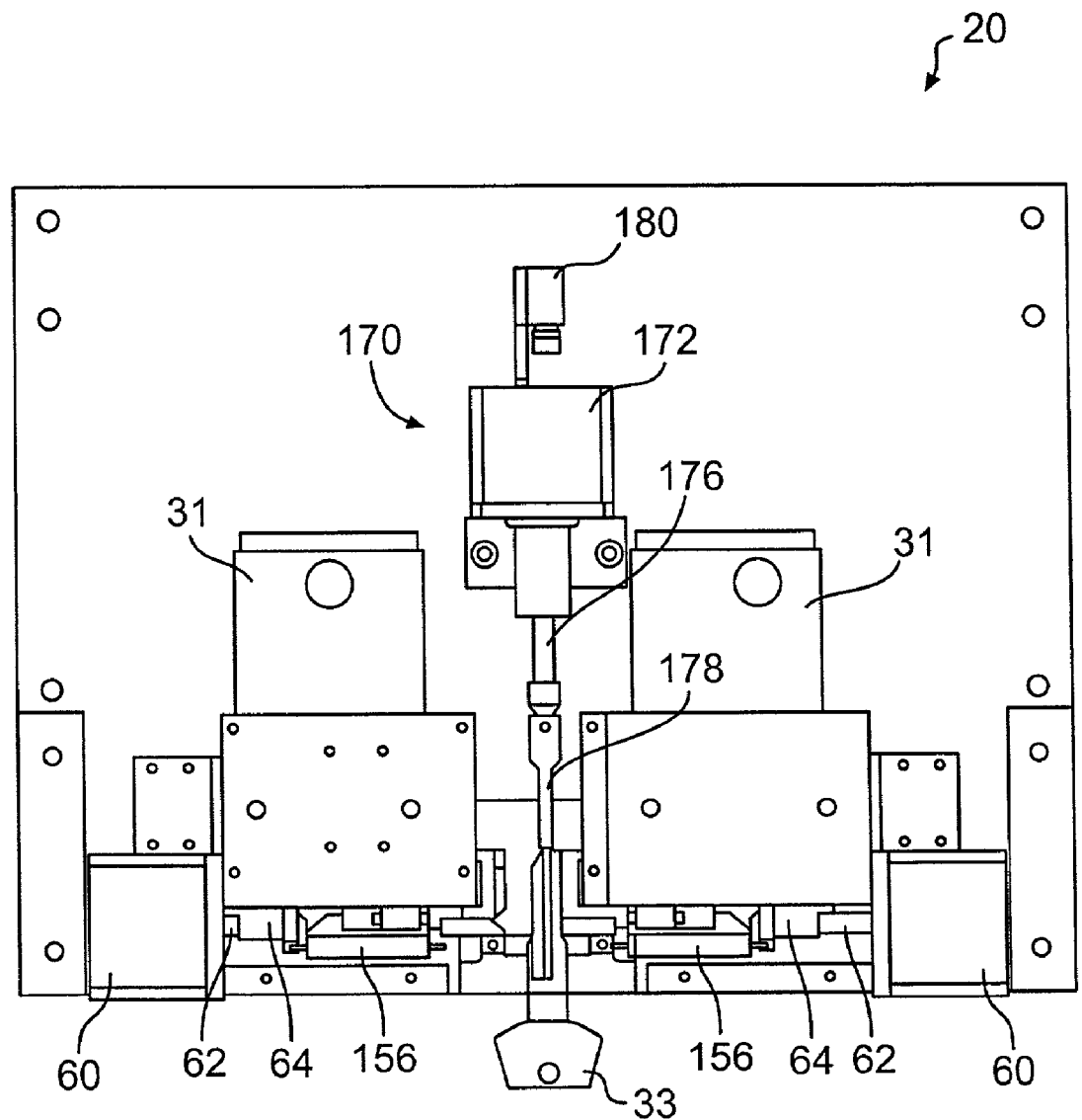
FIG. 7 is a top view of a key cutting machine according to the present invention illustrating a tip stop mechanism.
Figure 8:
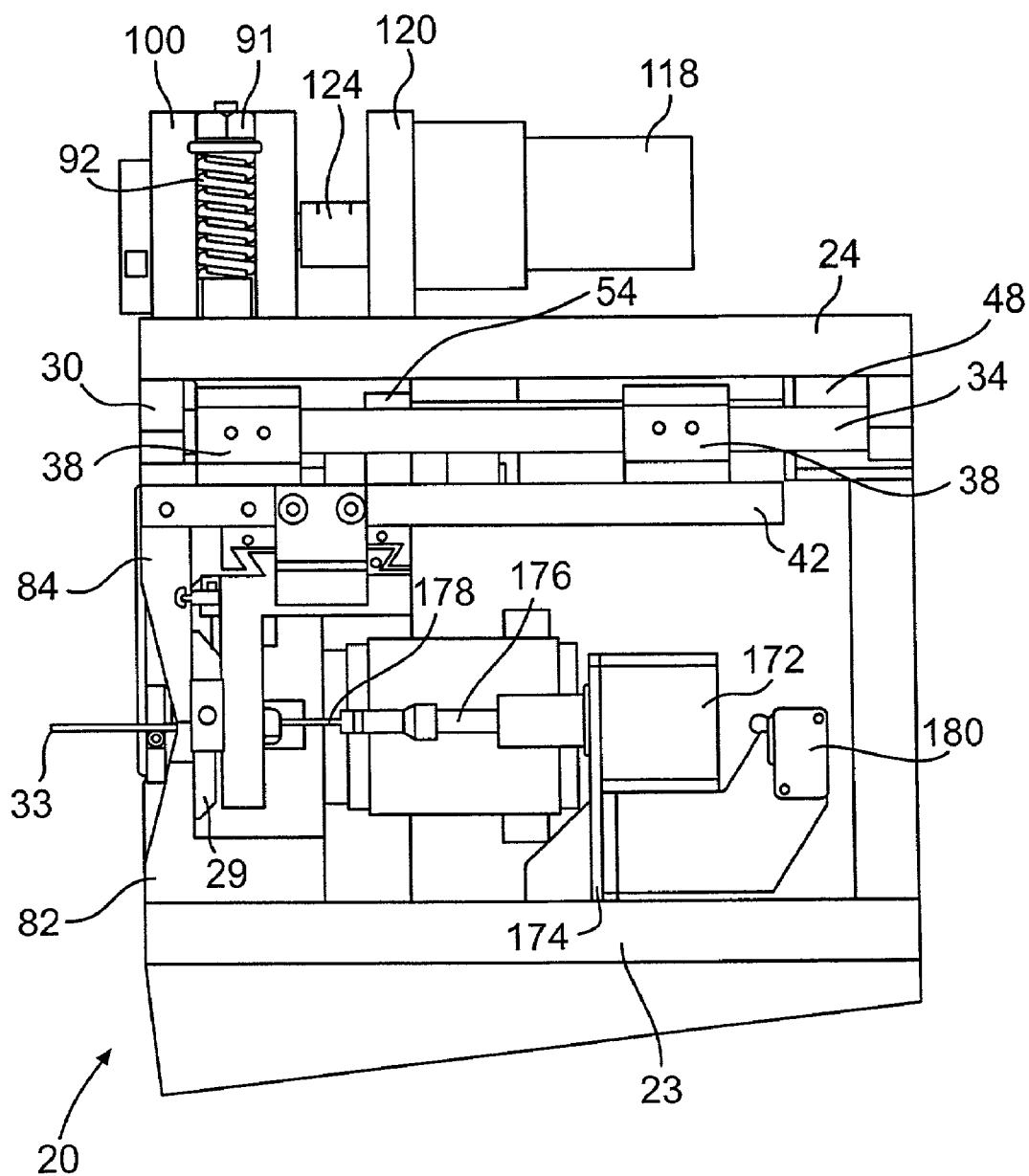
FIG. 8 is a side view of a cutting machine according to the present invention illustrating a tip stop mechanism.
Figure 12:
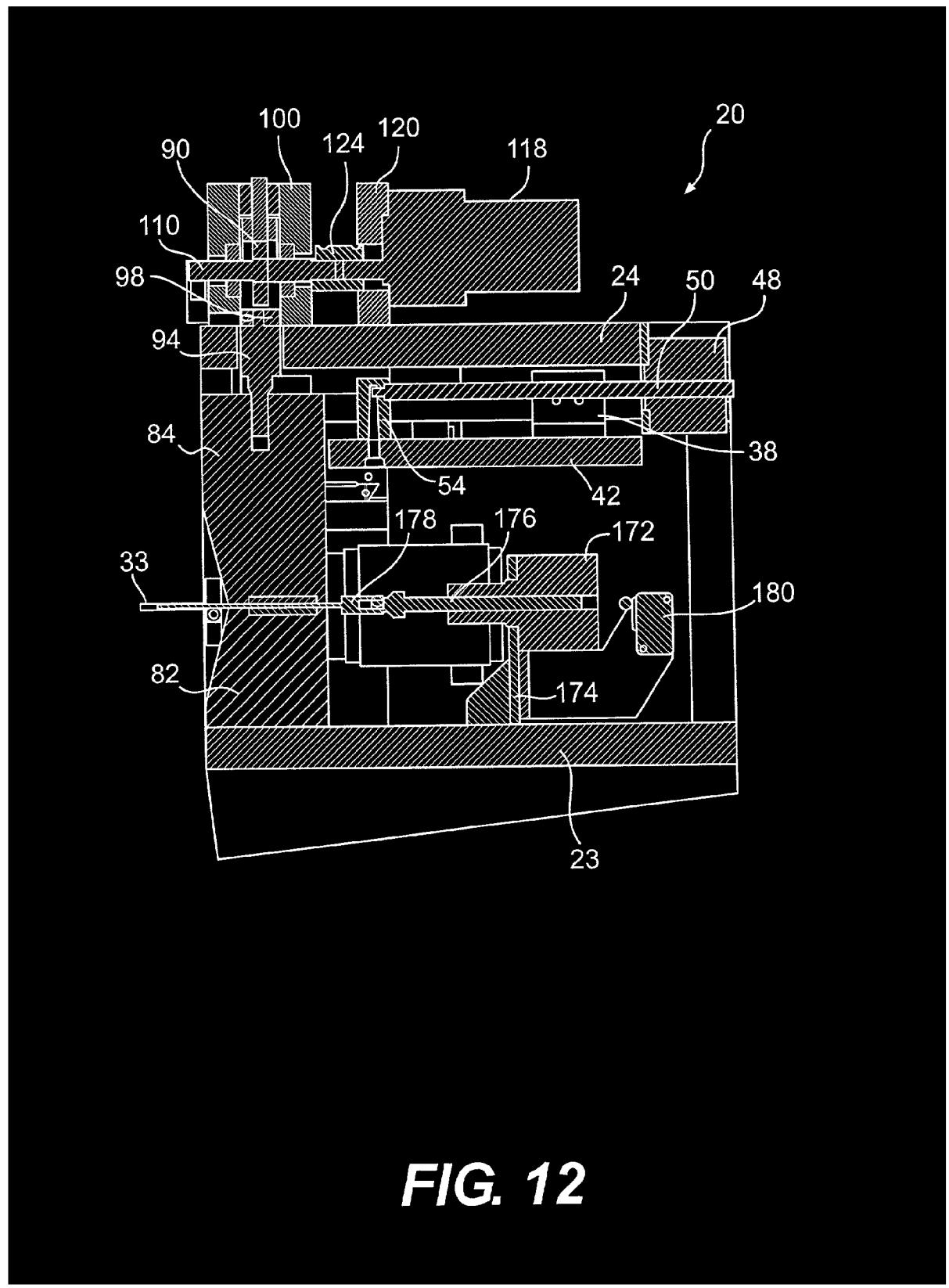
FIG. 12 is a is a section view of a key cutting machine taken along line A—A of FIG. 13.
Figure 13:
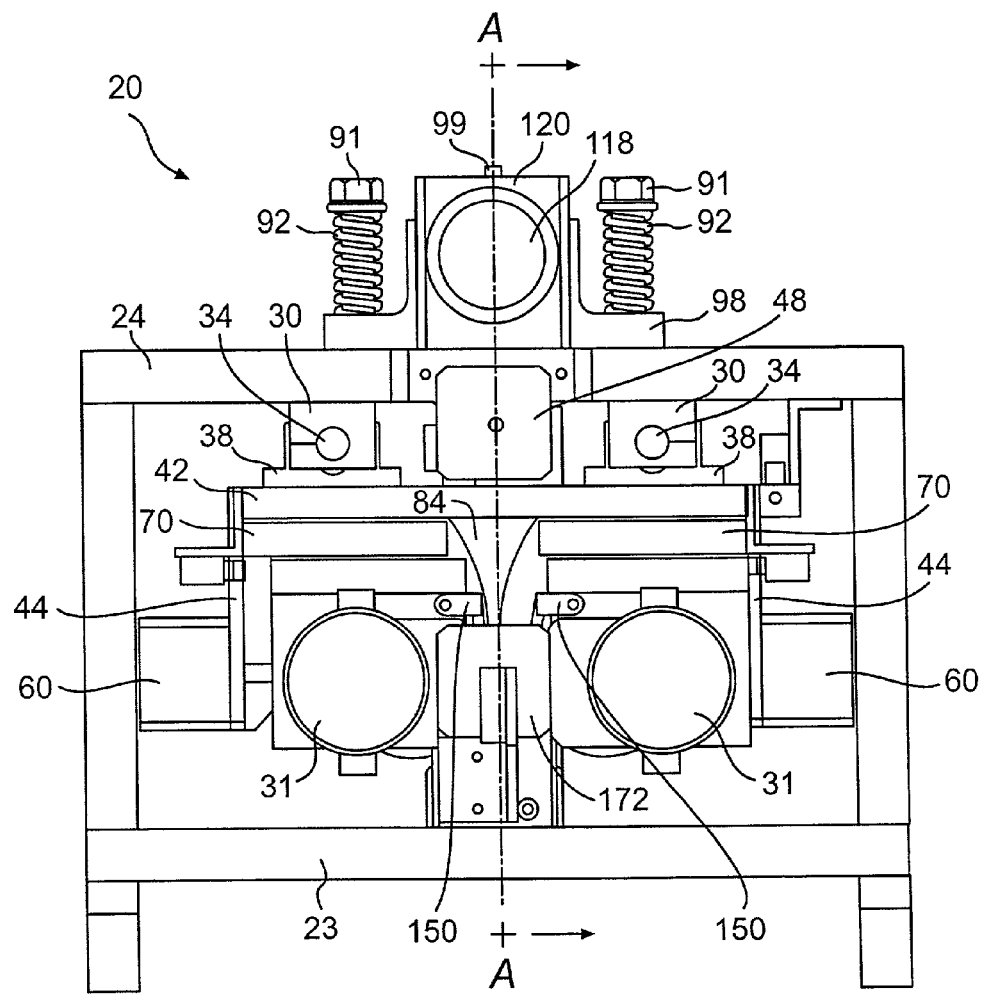
FIG. 13 is a rear view of a key cutting machine according to the present invention.
Figure 14:
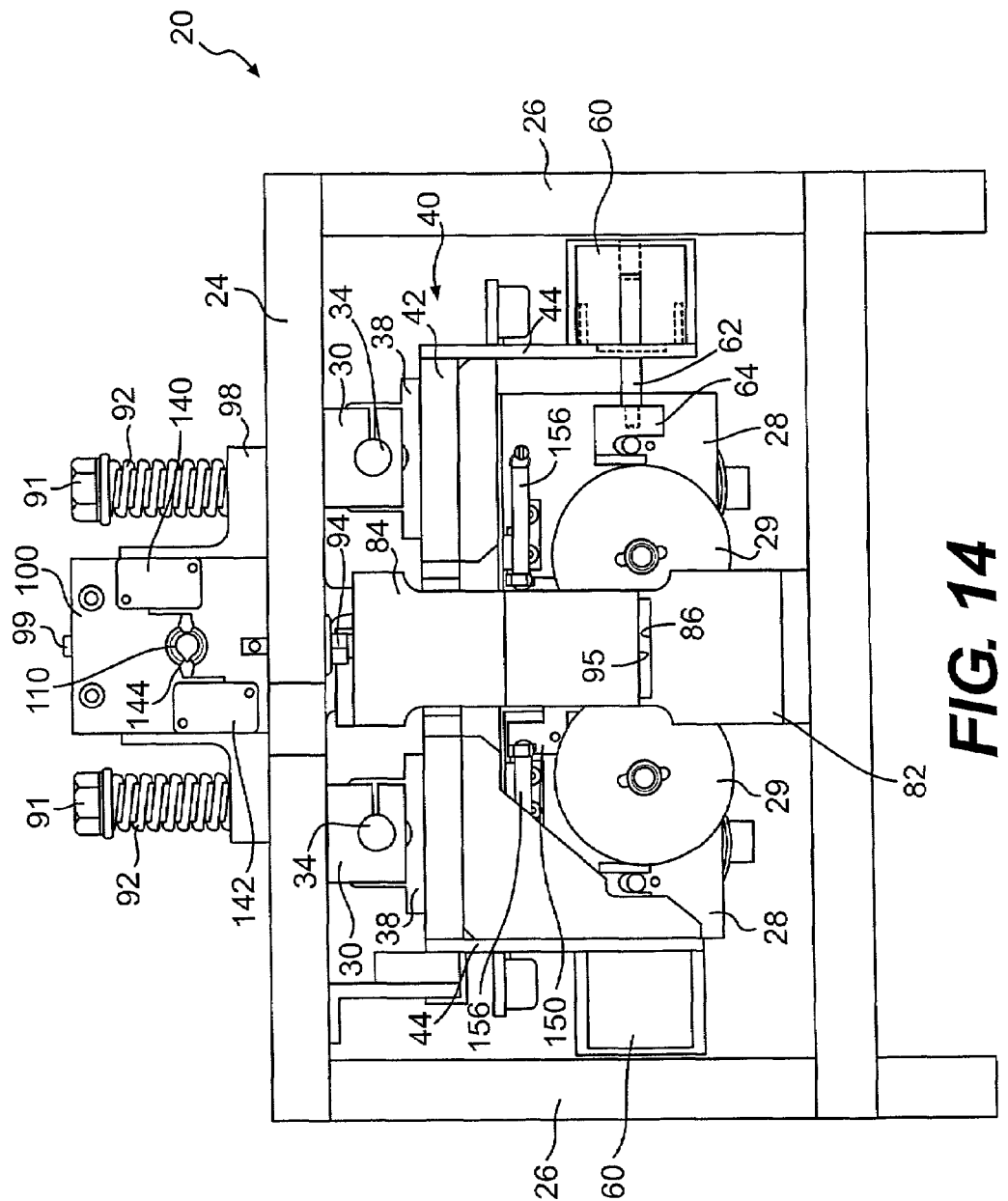
FIG. 14 is a front view of a key cutting machine according to the present invention illustrating a threaded shaft of a stepper motor for lateral movements.

To longitudinally position key blank 33, key cutting machine 20 includes a tip stop mechanism 170 illustrated in FIGS. 7, 8, and 12. Tip stop mechanism 170 includes a stepper motor 172 mounted to a block 174 supported on base 23. Instead of being supported on base 23, block 174 may be suspended from top frame 24. A threaded lead screw 176 extends through stepper motor 172 and one end thereof is connected to a tip stop 178. The front end of tip stop 178 is configured to engage the tip 37 (FIG. 11) of key blank 33. Similar to stepper motors 48 and 60 explained above, stepper motor 172 rotates threaded lead screw 176 in first and second directions to move tip stop 178 longitudinally to and away from key blank 33.

Tip stop mechanism 170 further includes a microswitch 180 to indicate the longitudinal home position of tip stop 178. When the back end of threaded lead screw 176 activates microswitch 180, key cutting machine 20 senses that tip stop 178 is in its longitudinal home position. From this longitudinal home position, key cutting machine 20 determines the amount of longitudinal movement that tip stop 178 needs to travel to position key blank 33 in a correct longitudinal position. Of course, the amount of longitudinal movement from the longitudinal home position varies depending on the type of key blank 33.

Similarly, stepper motors 60 have microswitches (not shown) to indicate the lateral home positions of cutting heads 28. From these lateral home positions, key cutting machine 20 determines the amount of lateral movement that each cutting head 28 needs to travel to position each paddle 150 in a correct lateral position and to cut blade portion 35 of key blank 33 to a desired depth. In addition, stepper motor 48 has a microswitch (not shown) to indicate the longitudinal home position of cutting heads 28. From this longitudinal home position, key cutting machine 20 determines the amount of longitudinal movement that cutting heads 28 need to travel in unison to cut a desired notch pattern on blade portion 35 of key blank 33.

Key cutting machine 20 eliminates the need for the cassette described in U.S. Pat. No. 5,676,504. The cassette described in '504 patent provides both positional alignment function and clamping function. As described above, however, paddles 150 and tip stop mechanism 170 perform the positional alignment function of the cassette described in '504 patent. Furthermore, clamping mechanism 80 performs the clamping function of the cassette described in '504 patent. Therefore, key cutting machine 20 does not require the cassette described in '504 patent.

Key cutting machine 20 cuts a desired notch pattern on key blank 33 without reference to or tracing of the notch pattern on a maser key. Rather, key cutting machine 20 cuts key blank 33 based on a series of code numbers defining a desired notch pattern. In addition to a series of code numbers defining a desired notch pattern, key cutting machine 20 needs relevant data (e.g., shape, length and width of blade, etc.) corresponding to the correct key blank. An operator may manually determine the correct key blank and input into a control panel (not shown) a unique identifier corresponding to the correct key blank. Based on the unique identifier entered, key cutting machine 20 retrieves the relevant information from its memory or database (not shown). As alternative to an operator manually determining the correct key blank, key cutting machine 20 may be connected to a key identification system, such as the system described in copending U.S. application Ser. No. 09/625,274 to identify the correct key blank. The entire disclosure of copending U.S. application Ser. No. 09/625,274 is hereby incorporated by reference. It is contemplated that other types of key identification systems may also be used.

The operation of the aforementioned key cutting machine 20 will now be described with reference to the attached drawings.

When an operator turns on or resets key cutting machine 20, cutting heads 28 move to their lateral and longitudinal home positions and tip stop 178 moves to its longitudinal home position. The type of key blank 33 and its unique identifier are then determined either by the operator manually or by a key identification system, such as the system described in copending U.S. application Ser. No. 09/625, 274. Based on the unique identifier entered, key cutting machine 20 retrieves the relevant information (e.g., shape, length and width of blade, etc.) about key blank 33 from its memory or database. In addition to the unique identifier, a series of code numbers defining a desired notch pattern is entered into key cutting machine 20. Alternatively, a notch pattern corresponding exactly to a captured image of a master key may be entered instead of a code defining the notch pattern. At this point, stepper motors 60 move cutting heads 28 laterally so that key guide portions 151 of paddles 150 are spaced apart by the distance corresponding to the width of key blank 33. Cutting heads 28 and tip stop 178, however, stay in their respective longitudinal home positions.

Depending on the type of key blank 33 to be cut, the lateral positions of cutting heads 28 may be symmetric or offset with respect to a vertical center line 190 (FIG. 3) of key cutting machine 20. For example, the lateral positions of cutting heads 28 are symmetric with respect to vertical center line 190 if a double-sided key blank is to be cut. On the other hand, the lateral positions of cutting heads 28 are offset to the left or to the right of vertical center line 190 if a single-sided key blank is to be cut. For a single-sided key blank, key cutting machine 20 may be programmed to use either one of two cutting heads 28 and the operator needs to insert the single-sided key blank in a correct orientation. For example, if key cutting machine 20 is programmed to use cutting head 28 to the right of vertical center line 190, the operator needs to insert a single-sided key blank so that the side edge to be cut faces to the right. To assist the operator in correctly inserting single-sided key blanks, key cutting machine 20 may provide instructions in its control panel or have an instruction label affixed on the front panel thereof.

After moving cutting heads 28 to their correct lateral positions, key cutting machine 20 asks the operator to insert key blank 33. When the operator inserts key blank 33 through the opening formed between recess 86 of anvil 82 and the bottom surface 95 of upper clamp 84, grooves 152 of key guide portions 151 of paddles 150 engage the side edges of key blank 33 and guide key blank 33 into its correct lateral position. Springs 156 biasing key guide portions 151 of paddles 150 away from the rotational axes of cutting wheels 29 automatically correct any lateral misalignment introduced by the operator.

The operator stops inserting key blank 33 when tip 37 of key blank 33 engages the front end of tip stop 178 or when the shoulder of key blank 33 engages the front surface of anvil 82. Then, the operator initiates the key cutting process. At this point, key blank 33 is in its correct lateral position but may not be in its correct longitudinal position because tip stop 178 is in its longitudinal home position. However, when the operator initiates the key cutting process, stepper motor 172 moves tip stop 178 to its correct longitudinal position. During its course of movement, tip stop 178 engages tip 37 of key blank 33 and moves key blank 33 to its correct longitudinal position.

After stepper motor 172 moves tip stop 178 to its correct longitudinal position, DC motor 118 rotates shaft 110 from its open position to its closed position, thereby allowing springs 92 to push upper clamp 84 down toward key blank 33. Under the biasing force of springs 92 and its own weight, upper clamp 84 presses down on key blank 33, which is supported on its opposite side by the bottom of recess 86 and elongated portion 83 of anvil 82. Preferably, tip stop 178 has a thickness less than any key blank to be cut by key cutting machine 20. Therefore, elongated portions 83 and 85 do not clamp tip stop 178, even when clamping the thinnest of key blanks.

After clamping key blank 33 in its correct lateral and longitudinal positions, key cutting machine 20 moves cutting heads 28 laterally and longitudinally to cut a desired notch pattern on key blank 33 according to the series of code numbers entered. Alternatively, cutting heads 28 may cut a notch pattern based on a captured image, such as a digital or video image, of a master key. In other words, cutting heads 28 may cut either a notch pattern corresponding exactly to a captured image of a master key or a notch pattern corresponding to an original specification based on the captured image of the master key. In the latter case, key cutting machine 20 reproduces a notch pattern corresponding to the original specification even if the master key has worn down because of repeated use. While cutting heads 28 move longitudinally in unison, they move independently in lateral directions. Accordingly, during the key cutting process, key cutting machine 20 moves both cutting heads 28 laterally if a double-sided key blank 33 is inserted. However, key cutting machine 20 moves only one of cutting heads 28 laterally during the key cutting process if a single-sided key blank 33 is inserted. The other cutting head 28, on the other hand, does not move laterally during the key cutting process. Before the key cutting process starts, key cutting machine 20 retracts the other cutting head 28 away from a single-sided key blank 33.

After cutting a desired notch pattern, DC motor 118 rotates shaft 110 from its closed position to its open position. Then, upper clamp 84 moves up to allow the operator to remove key blank 33 from key cutting machine 20.

Figure 21:
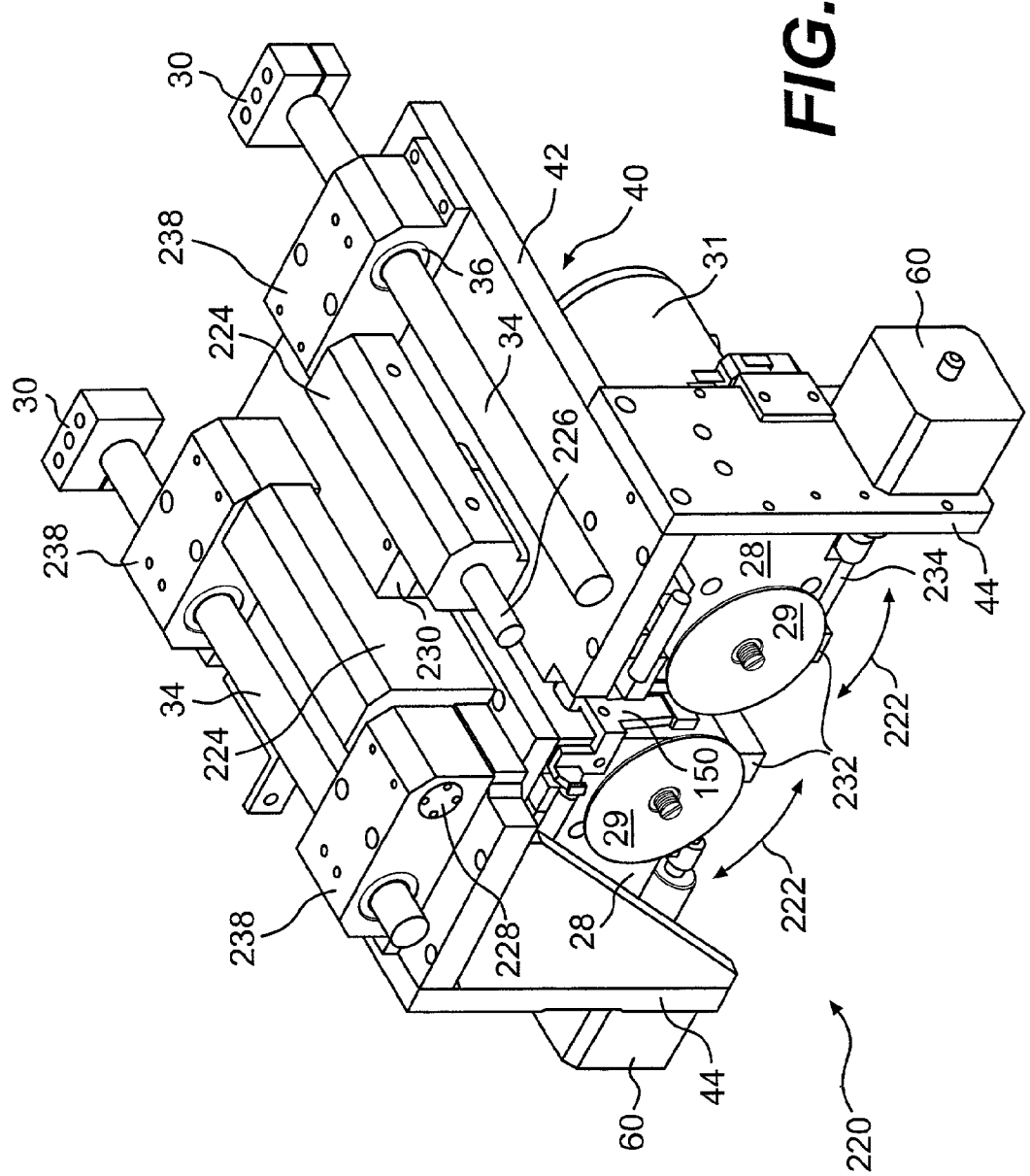
FIG. 21 is a partial perspective view of another embodiment of a key cutting machine according to the present invention.
Figure 22:
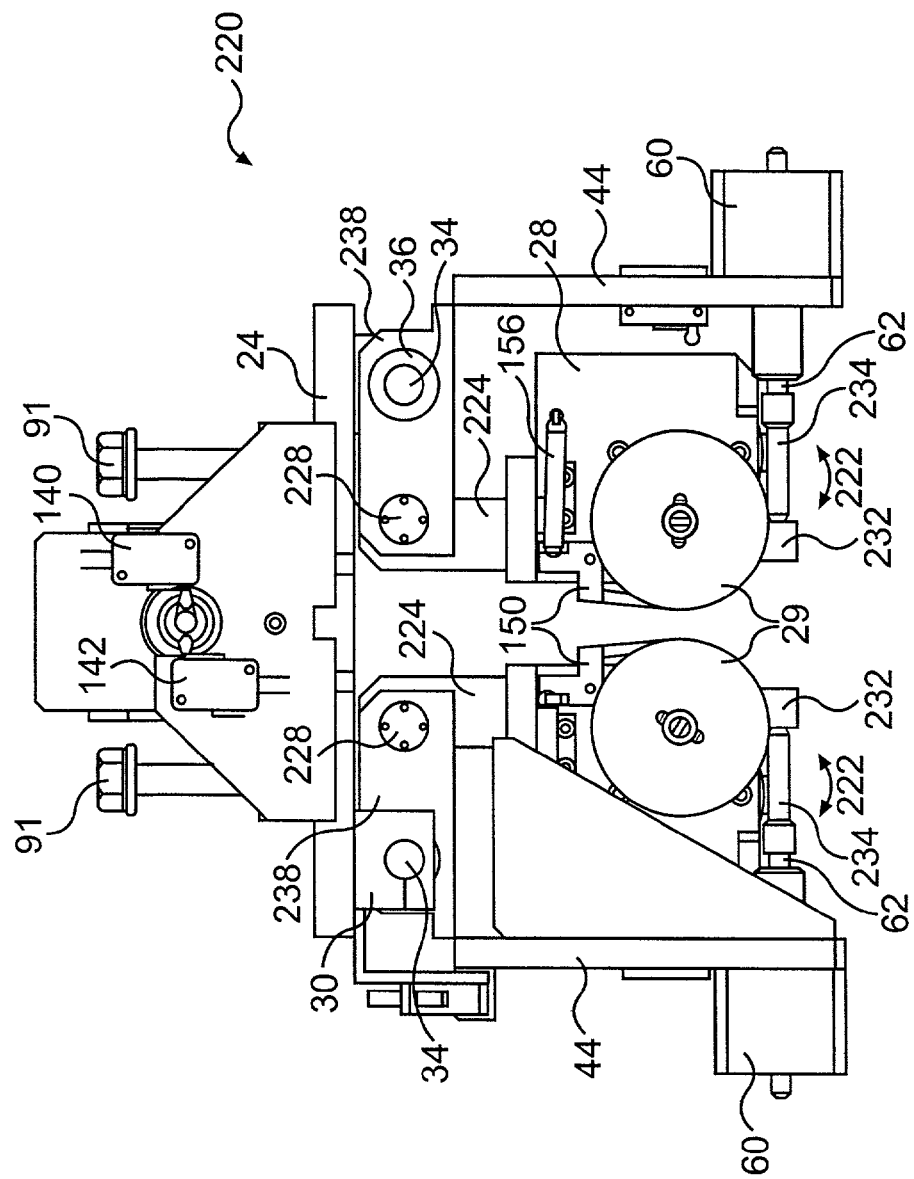
FIG. 22 is a partial front view of the key cutting machine of FIG. 21 illustrating pivot arms.
Figure 23:
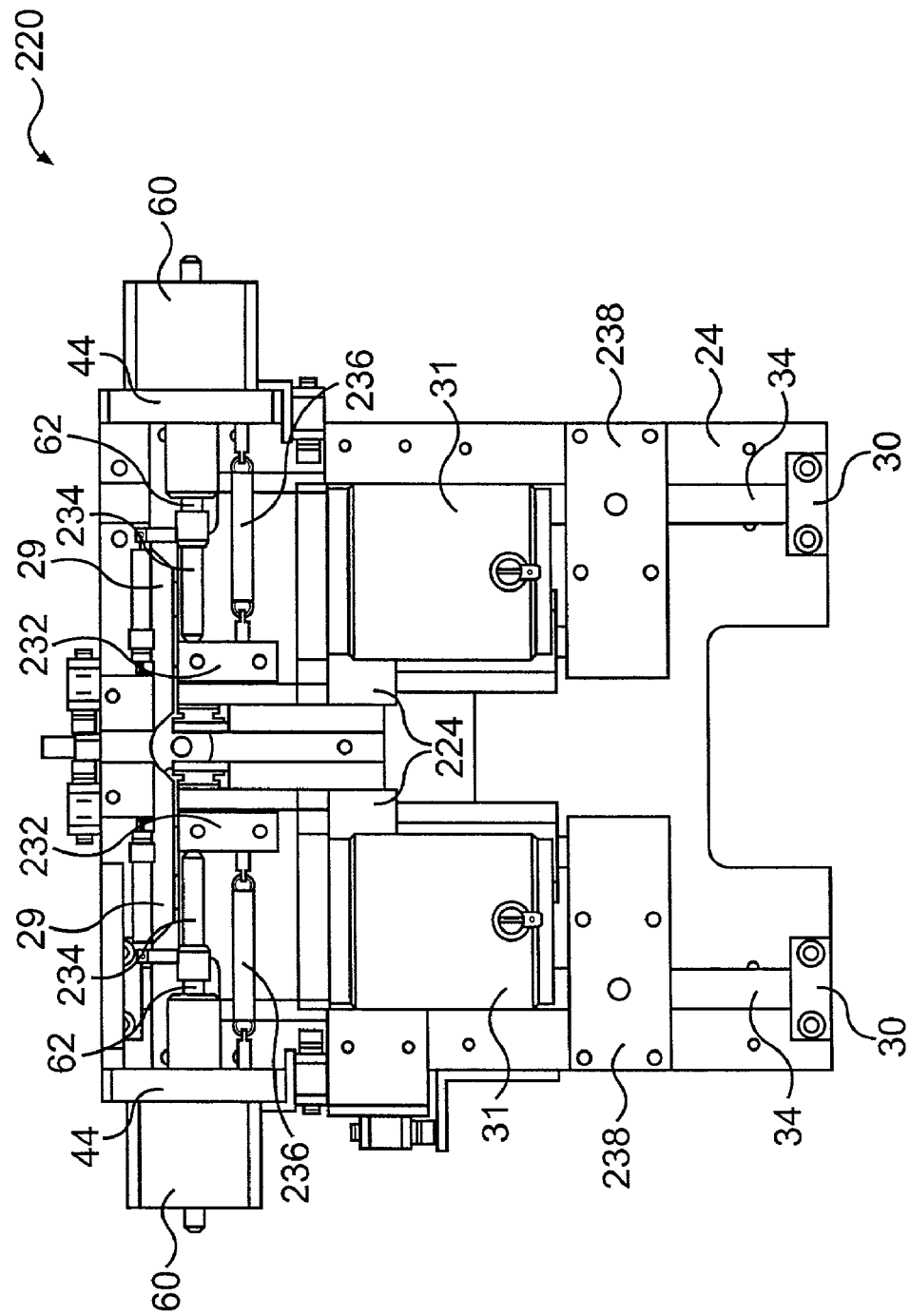
FIG. 23 is a partial bottom view of the key cutting machine of FIG. 21 illustrating a push block and a spring.

In accordance with the present invention, another embodiment of a key cutting machine is illustrated in FIGS. 21–23. Clamp mechanism 80 and a housing including top frame 24 and side frame 26 are omitted in FIG. 21 for the purpose of illustrating inner details. Likewise, a portion of clamp mechanism 80, side frame 26, and top portion 42 of suspension bracket 40 are omitted in FIGS. 22 and 23. Many aspects of a key cutting machine 220 are identical to key cutting machine 20 illustrated in FIGS. 1–20. However, unlike each cutting head 28 in key cutting machine 20, which moves laterally in a linear motion, each cutting head 28 in key cutting machine 220 moves laterally in a pivoting motion as designated by reference number 222.

To move each cutting head 28 laterally in a pivoting motion, each cutting head 20 includes a pivot arm 224. Each pivot arm 224 includes a pivot rod 226, which is pivotally mounted to a corresponding pair of bearing supports 238 through sleeve bearings 228. Each pivot arm 224 extends through top portion 42 of suspension bracket 40 through an opening 230. Each pivot arm 224 is, therefore, pivotally suspended from a corresponding pair of bearing supports 238. Bearing supports 238 are connected to top portion 42 of suspension bracket 40. Accordingly, both cutting heads 28, including their corresponding pivot arms 224, move longitudinally in unison as suspension bracket 40 moves along guide rails 34 in longitudinal directions. Each cutting head 28, however, independently moves laterally in a pivoting motion.

Each cutting head 28 includes a push block 232 and a push rod 234. Each push rod 234 is connected to threaded shaft 62 of stepper motor 60 and abuts a corresponding push block 232 extending from a bottom portion of a corresponding cutting head 28. Each cutting head 28 further includes a spring 236 (FIG. 23) connected at one end to a corresponding push block 232 and at the other end to a corresponding side portion 44 of suspension bracket 40. Each spring 236 biases a corresponding push block 232 toward a corresponding side portion 44 of suspension bracket 40. In other words, each spring 236 biases a corresponding push block 232 away from clamp mechanism 80. As each push rod 234 moves linearly away from clamp mechanism 80, a corresponding spring 236 pulls a corresponding push block 232 and pivots a corresponding pivot arm 224 away from clamp mechanism 80. Accordingly, each cutting head 28 pivots away from clamp mechanism 80 as push rod 234 moves linearly away from clamp mechanism 80. Conversely, as each push rod 234 moves linearly toward clamp mechanism 80, a corresponding push rod 234 pushes a corresponding push block 232 and overcomes the biasing force exerted by a corresponding spring 236. Accordingly, a corresponding pivot arm 224 and a corresponding cutting head 28 pivot toward clamp mechanism 80 as each push rod 234 moves linearly toward clamp mechanism 80.

This arrangement of push rod 234 abutting against push block 232 biased by spring 236 provides an "anti-backlash" feature. Because push rod 234 pushes against the biasing force exerted by spring 236 on push block 232, push rod 234 and push block 232 are always in contact with each other. In other words, even if the contact surfaces between push rod 234 and push block 232 are worn down or dented, no gap develops between push rod 234 and push block 232. Accordingly, the lateral movements of cutting heads 28 are unaffected by worn-down or dented contact surfaces. Without this "anti-backlash" feature, a gap developed between worn-down or dented engaging surfaces may compromise accurate lateral movements of cutting heads 28.

Aside from the lateral movement of each cutting head 28 in a pivoting motion, the operation of key cutting machine 220 is identical to that of key cutting machine 20.

It will be apparent to those skilled in the art that various modifications and variations can be made in the device of the present invention without departing from the scope or spirit of the invention. Other embodiments of the invention will be apparent to those skilled in the art from consideration of the specification and practice of the invention disclosed herein.

What is claimed is:

1. A key cutting machine, comprising:
a front end through which a key blank is inserted and a rear end;
a pair of cutting heads, each cutting head including a cutting wheel having an edge;
an alignment structure mounted behind each cutting wheel between the rear end and each cutting wheel, each alignment structure having a key guide portion aligned tangent to the edge of a corresponding cutting wheel to engage and position the key blank laterally; and
a clamp mechanism positioned between the cutting heads and configured to hold the key blank stationary.

2. The key cutting machine of claim 1, wherein each cutting head further includes a spring biasing the key guide portion of the alignment structure away from a rotational axis of a corresponding cutting wheel.

3. The key cutting machine of claim 2, wherein the key guide portion of each alignment structure is pivotable toward the rotational axis of a corresponding cutting wheel.

4. The key cutting machine of claim 1, wherein the clamp mechanism is stationary and the cutting heads are movable relative to the clamp mechanism.

5. The key cutting machine of claim 4, wherein the cutting heads are movable longitudinally in unison and are movable independently of each other laterally.

6. The key cutting machine of claim 5, wherein each cutting head is movable laterally in a linear motion.

7. The key cutting machine of claim 5, wherein each cutting head is movable laterally in a pivoting motion.

8. The key cutting machine of claim 1, further comprising a housing including a top frame, a pair of guide rails suspended from the top frame of the housing and extending longitudinally, a pair of bearing supports slidably mounted to each guide rail, and a carriage connected to the bearing supports.

9. The key cutting machine of claim 8, wherein the cutting heads are suspended below the carriage and are movable longitudinally in unison as the carriage slides longitudinally.

10. The key cutting machine of claim 9, wherein the carriage includes a pair of grooves extending laterally and each cutting head further includes a projection slidably engaged with a corresponding groove so that each cutting head is movable laterally in a linear motion.

11. The key cutting machine of claim 9, wherein each cutting head further includes an arm pivotally suspended from a corresponding pair of bearing supports so that each cutting head is movable laterally in a pivoting motion.

12. The key cutting machine of claim 11, wherein each cutting head further includes a push block and a spring biasing the push block away from the clamp mechanism.

13. The key cutting machine of claim 1, further comprising a housing including a top frame, wherein the clamp mechanism includes a lower clamp and an upper clamp, the upper clamp suspended from the top frame of the housing and vertically movable relative to the lower clamp.

14. The key cutting machine of claim 13, wherein the housing further includes a base and the lower clamp is supported on the base of the housing.

15. The key cutting machine of claim 14, wherein the lower clamp includes a recess configured to support a shank portion of the key blank and an elongated portion configured to support a blade portion of the key blank.

16. The key cutting machine of claim 15, wherein the upper clamp includes a bottom surface configured to press the shank portion of the key blank and an elongated portion configured to press the blade portion of the key blank.

17. The key cutting machine of claim 13, wherein the clamp mechanism further includes a block positioned above the top frame of the housing and a clamp screw extending through the top frame of the housing and connected to the block and the upper clamp.

18. The key cutting machine of claim 17, wherein the block is vertically movable between an open position away from the top frame of the housing and a closed position toward the top frame of the housing.

19. The key cutting machine of claim 18, wherein the clamp mechanism further includes a pair of springs biasing the block toward the closed position.

20. The key cutting machine of claim 19, wherein the block includes a hole extending therethrough and the clamp mechanism further includes a shaft and a cam eccentrically mounted on the shaft in the hole of the block to move the block between the open and closed positions.

21. The key cutting machine of claim 20, wherein the block is movable between the open and closed positions for every 180° rotation of the shaft.

22. The key cutting machine of claim 21, wherein the clamp mechanism further includes a pair of position switches spaced apart from each other by 180° and the shaft includes a projection engageable with the position switches for every 180° rotation of the shaft.

23. The key cutting machine of claim 1, further comprising a tip stop mechanism positioned behind the clamp mechanism and configured to engage and position the key blank longitudinally.

24. A key cutting machine for cutting a notch pattern on a key blank, comprising:
  a front end configured to longitudinally receive the key blank inserted therethrough;
  a housing including a top frame and a base; and
  a pair of cutting heads suspended below the top frame of the housing without being supported on the base of the housing and movable longitudinally in unison relative to the top frame and base, in a longitudinal direction parallel to the direction of key blank insertion, each cutting head including a device connected thereto for actively moving each cutting head exclusively in lateral directions, perpendicular to the longitudinal direction of key blank insertion, and a cutting wheel rotatable to cut the notch pattern on the key blank.

25. The key cutting machine of claim 24, wherein each cutting head further includes a paddle mounted behind a corresponding cutting wheel and the paddle has a key guide portion aligned tangent to an edge of the corresponding cutting wheel to engage and position the key blank laterally.

26. The key cutting machine of claim 25, wherein each cutting head further includes a spring biasing the key guide portion of the paddle away from a rotational axis of a corresponding cutting wheel.

27. The key cutting machine of claim 26, wherein the key guide portion of each paddle is pivotable toward the rotational axis of a corresponding cutting wheel.

28. The key cutting machine of claim 24, further comprising a clamp mechanism positioned between the cutting heads and configured to hold the key blank stationary.

29. The key cutting machine of claim 28, wherein the clamp mechanism is stationary and the cutting heads are movable relative to the clamp mechanism.

30. The key cutting machine of claim 28, further comprising a tip stop mechanism positioned behind the clamp mechanism and configured to engage and position the key blank longitudinally.

31. The key cutting machine of claim 24, wherein each cutting head is movable laterally in a linear motion.

32. The key cutting machine of claim 24, wherein each cutting head is movable laterally in a pivoting motion.

33. The key cutting machine of claim 24, further comprising a pair of guide rails suspended from the top frame of the housing and extending longitudinally, a pair of bearing supports slidably mounted to each guide rail, and a carriage connected to the bearing supports.

34. The key cutting machine of claim 33, wherein the cutting heads are suspended below the carriage and movable longitudinally in unison as the carriage slides longitudinally.

35. The key cutting machine of claim 34, wherein the carriage includes a pair of grooves extending laterally and each cutting head further includes a projection slidably engaged with a corresponding groove so that each cutting head is movable laterally in a linear motion.

36. The key cutting machine of claim 34, wherein each cutting head further includes an arm pivotally suspended from a corresponding pair of bearing supports so that each cutting head is movable laterally in a pivoting motion.

37. The key cutting machine of claim 36, wherein each cutting head further includes a push block and a spring biasing the push block away from the other cutting head.

38. The key cutting machine of claim 24, further comprising a clamp mechanism positioned between the cutting heads and configured to hold the key blank stationary, wherein the clamp mechanism includes a lower clamp and an upper clamp, the upper clamp suspended from the top frame of the housing and vertically movable relative to the lower clamp.

39. The key cutting machine of claim 38, wherein the lower clamp is supported on the base of the housing.

40. The key cutting machine of claim 39, wherein the lower clamp includes a recess configured to support a shank portion of the key blank and an elongated portion configured to support a blade portion of the key blank.

41. The key cutting machine of claim 40, wherein the upper clamp includes a bottom surface configured to press the shank portion of the key blank and an elongated portion configured to press the blade portion of the key blank.

42. The key cutting machine of claim 38, wherein the clamp mechanism further includes a block positioned above the top frame of the housing and a clamp screw extending through the top frame of the housing and connected to the block and the upper clamp.

43. The key cutting machine of claim 42, wherein the block is vertically movable between an open position away from the top frame of the housing and a closed position toward the top frame of the housing.

44. The key cutting machine of claim 43, wherein the clamp mechanism further includes a pair of springs biasing the block toward the closed position.

45. The key cutting machine of claim 44, wherein the block includes a hole extending therethrough and the clamp mechanism further includes a shaft and a cam eccentrically mounted on the shaft in the hole of the block to move the block between the open and closed positions.

46. The key cutting machine of claim 45, wherein the block is movable between the open and closed positions for every 180° rotation of the shaft.

47. The key cutting machine of claim 46, wherein the clamp mechanism further includes a pair of position switches spaced apart from each other by 180° and the shaft includes a projection engageable with the position switches for every 180° rotation of the shaft.

48. A key cutting machine for cutting a notch pattern on a key blank, comprising:

a housing including a top frame;

a pair of cutting heads positioned within the housing, each cutting head including a cutting wheel rotatable to cut the notch pattern on the key blank;

a clamp mechanism positioned between the cutting heads, the clamp mechanism including a lower clamp and an upper clamp, the upper clamp being suspended from the top frame of the housing and vertically movable relative to the lower clamp to hold the key blank stationary; and a block positioned above the top frame of the housing and a clamp screw extending through the top frame of the housing and connected to the block and the upper clamp.

49. The key cutting machine of claim 48, wherein the housing further includes a base and the lower clamp is supported on the base of the housing.

50. The key cutting machine of claim 49, wherein the lower clamp includes a recess configured to support a shank portion of the key blank and an elongated portion configured to support a blade portion of the key blank.

51. The key cutting machine of claim 50, wherein the upper clamp includes a bottom surface configured to press the shank portion of the key blank and an elongated portion configured to press the blade portion of the key blank.

52. The key cutting machine of claim 48, wherein the block is vertically movable between an open position away from the top frame of the housing and a closed position toward the top frame of the housing.

53. The key cutting machine of claim 52, wherein the clamp mechanism further includes a pair of springs biasing the block toward the closed position.

54. The key cutting machine of claim 53, wherein the block includes a hole extending therethrough and the clamp mechanism further includes a shaft and a cam eccentrically mounted on the shaft in the hole of the block to move the block between the open and closed positions.

55. The key cutting machine of claim 54, wherein the block is movable between the open and closed positions for every 180° rotation of the shaft.

56. The key cutting machine of claim 55, wherein the clamp mechanism further includes a pair of position switches spaced apart from each other by 180° and the shaft includes a projection engageable with the position switches for every 180° rotation of the shaft.

57. The key cutting machine of claim 48, wherein each cutting head further includes a paddle mounted behind a corresponding cutting wheel and the paddle has a key guide portion aligned tangent to an edge of the corresponding cutting wheel to engage and position the key blank laterally.

58. The key cutting machine of claim 57, wherein each cutting head further includes a spring biasing the key guide portion of the paddle away from a rotational axis of a corresponding cutting wheel.

59. The key cutting machine of claim 58, wherein the key guide portion of each paddle is pivotable toward the rotational axis of a corresponding cutting wheel.

60. The key cutting machine of claim 48, wherein the clamp mechanism is stationary and the cutting heads are movable relative to the clamp mechanism.

61. The key cutting machine of claim 60, wherein the cutting heads are movable longitudinally in unison and are movable independently of each other laterally.

62. The key cutting machine of claim 61, wherein each cutting head is movable laterally in a linear motion.

63. The key cutting machine of claim 61, wherein each cutting head is movable laterally in a pivoting motion.

64. The key cutting machine of claim 48, further comprising a pair of guide rails suspended from the top frame of the housing and extending longitudinally, a pair of bearing supports slidably mounted to each guide rail, and a carriage connected to the bearing supports.

65. The key cutting machine of claim 64, wherein the cutting heads are suspended below the carriage and movable longitudinally in unison as the carriage slides longitudinally.

66. The key cutting machine of claim 65, wherein the carriage includes a pair of grooves extending laterally and each cutting head further includes a projection slidably engaged with a corresponding groove so that each cutting head is movable laterally in a linear motion.

67. The key cutting machine of claim 65, wherein each cutting head further includes an arm pivotally suspended from a corresponding pair of bearing supports so that each cutting head is movable laterally in a pivoting motion.

68. The key cutting machine of claim 67, wherein each cutting head further includes a push block and a spring biasing the push block away from the clamp mechanism.

69. The key cutting machine of claim 48, further comprising a tip stop mechanism positioned behind the clamp mechanism and configured to engage and position the key blank longitudinally.

70. A key cutting machine for cutting a notch pattern on a key blank, comprising:

a front end configured to longitudinally receive the key blank inserted therethrough;

a housing including a top frame;

a clamp mechanism configured to hold the key blank stationary; and a pair of cutting heads connected to a suspension bracket suspended below the top frame, the cutting heads being movable relative to the clamp mechanism, the suspension bracket and cutting heads being movable longitudinally in unison relative to the top frame, in a longitudinal direction parallel to the direction of key blank insertion, each cutting head including a device connected thereto for actively moving each cutting head exclusively in lateral directions, perpendicular to the longitudinal direction of key blank insertion, and a cutting wheel rotatable to cut the notch pattern on the key blank.

71. The key cutting machine of claim 70, wherein each cutting head further includes a paddle mounted behind a corresponding cutting wheel and the paddle has a key guide portion aligned tangent to an edge of the corresponding cutting wheel to engage and position the key blank laterally.

72. The key cutting machine of claim 71, wherein each cutting head further includes a spring biasing the key guide portion of the paddle away from a rotational axis of a corresponding cutting wheel.

73. The key cutting machine of claim 72, wherein the key guide portion of each paddle is pivotable toward the rotational axis of a corresponding cutting wheel.

74. The key cutting machine of claim 70, wherein each cutting head is movable laterally in a linear motion.

75. The key cutting machine of claim 70, wherein each cutting head is movable laterally in a pivoting motion.

76. The key cutting machine of claim 70, further comprising a pair of guide rails suspended from the top frame of the housing and extending longitudinally, a pair of bearing supports slidably mounted to each guide rail, and wherein the suspension bracket is connected to the bearing supports.

77. The key cutting machine of claim 76, wherein the cutting heads are suspended below the suspension bracket and movable longitudinally in unison as the suspension bracket slides longitudinally.

78. The key cutting machine of claim 77, wherein the suspension bracket includes a pair of grooves extending laterally and each cutting head further includes a projection slidably engaged with a corresponding groove so that each cutting head is movable laterally in a linear motion.

79. The key cutting machine of claim 77, wherein each cutting head further includes an arm pivotally suspended from a corresponding pair of bearing supports so that each cutting head is movable laterally in a pivoting motion.

80. The key cutting machine of claim 79, wherein each cutting head further includes a push block and a spring biasing the push block away from the clamp mechanism.

81. The key cutting machine of claim 70, wherein the clamp mechanism includes a lower clamp and an upper clamp, the upper clamp suspended from the top frame of the housing and vertically movable relative to the lower clamp.

82. The key cutting machine of claim 81, wherein the lower clamp is supported on the base of the housing.

83. The key cutting machine of claim 82, wherein the lower clamp includes a recess configured to support a shank portion of the key blank and an elongated portion configured to support a blade portion of the key blank.

84. The key cutting machine of claim 83, wherein the upper clamp includes a bottom surface configured to press the shank portion of the key blank and an elongated portion configured to press the blade portion of the key blank.

85. The key cutting machine of claim 81, wherein the clamp mechanism further includes a block positioned above the top frame of the housing and a clamp screw extending through the top frame of the housing and connected to the block and the upper clamp.

86. The key cutting machine of claim 85, wherein the block is vertically movable between an open position away from the top frame of the housing and a closed position toward the top frame of the housing.

87. The key cutting machine of claim 86, wherein the clamp mechanism further includes a pair of springs biasing the block toward the closed position.

88. The key cutting machine of claim 87, wherein the block includes a hole extending therethrough and the clamp mechanism further includes a shaft and a cam eccentrically mounted on the shaft in the hole of the block to move the block between the open and closed positions.

89. The key cutting machine of claim 88, wherein the block is movable between the open and closed positions for every 180° rotation of the shaft.

90. The key cutting machine of claim 89, wherein the clamp mechanism further includes a pair of position switches spaced apart from each other by 180° and the shaft includes a projection engageable with the position switches for every 180° rotation of the shaft.

91. A method for cutting a notch pattern on a key blank using a key cutting machine, the key cutting machine including a clamp mechanism, a tip stop, and a pair of cutting heads, each cutting head including a cutting wheel and a paddle mounted behind the cutting wheel, the method comprising the steps of:

moving the cutting heads laterally to position the paddles at lateral positions spaced apart from each other by a width of the key blank;

inserting the key blank into the clamp mechanism;

positioning the key blank laterally by engaging the key blank with the paddles;

engaging a tip of the key blank with the tip stop;

positioning the key blank at a correct longitudinal position by moving the tip stop longitudinally;

clamping the key blank stationary using the clamp mechanism; and moving at least one of the cutting heads relative to the clamp mechanism to cut the notch pattern on the key blank.

92. The method of claim 91, wherein the step of moving at least one of the cutting heads relative to the clamp mechanism includes the steps of:

moving the cutting heads longitudinally in unison; and moving the at least one of the cutting heads laterally independent of the other of the cutting heads.

93. The method of claim 92, wherein the at least one of the cutting heads is moved laterally in a linear motion.

94. The method of claim 92, wherein the at least one of the cutting heads is moved laterally in a pivoting motion.

95. The method of claim 91, wherein the step of clamping the key blank stationary includes the step of moving an upper clamp vertically downwardly toward a lower clamp.

96. The method of claim 91, wherein the paddle corresponding to the at least one of the cutting heads is collapsed toward a rotational axis of a corresponding cutting wheel when the at least one of the cutting heads is moved toward the clamp mechanism.

97. A key cutting machine, comprising:

a pair of cutting heads, each cutting head including a cutting wheel having an edge;

an alignment structure associated with each cutting wheel, each alignment structure having a key guide portion aligned tangent to the edge of a corresponding cutting wheel to engage and position a key blank laterally;

a clamp mechanism positioned between the cutting heads and configured to hold the key blank stationary; and wherein the key guide portion of each alignment structure pivots toward the rotational axis of a corresponding cutting wheel upon a predetermined lateral movement of the cutting wheel toward the key blank.

98. The key cutting machine of claim 97, wherein each cutting head further includes a spring biasing the key guide portion of the alignment structure away from a rotational axis of a corresponding cutting wheel.

99. The key cutting machine of claim 97, wherein the clamp mechanism is stationary and the cutting heads are movable relative to the clamp mechanism.

100. The key cutting machine of claim 99, wherein the cutting heads are movable longitudinally in unison and are movable independently of each other laterally.

101. The key cutting machine of claim 100, wherein each cutting head is movable laterally in a linear motion.

102. The key cutting machine of claim 97, further comprising a housing including a top frame, a pair of guide rails suspended from the top frame of the housing and extending longitudinally, a pair of bearing supports slidably mounted to each guide rail, and a carriage connected to the bearing supports.

103. The key cutting machine of claim 102, wherein the cutting heads are suspended below the carriage and are movable longitudinally in unison as the carriage slides longitudinally.

104. The key cutting machine of claim 103, wherein the carriage includes a pair of grooves extending laterally and each cutting head further includes a projection slidably engaged with a corresponding groove so that each cutting head is movable laterally in a linear motion.

105. The key cutting machine of claim 97, further comprising a housing including a top frame, wherein the clamp mechanism includes a lower clamp and an upper clamp, the upper clamp suspended from the top frame of the housing and vertically movable relative to the lower clamp.

106. The key cutting machine of claim 105, wherein the housing further includes a base and the lower clamp is supported on the base of the housing.

107. The key cutting machine of claim 106, wherein the lower clamp includes a recess configured to support a shank portion of the key blank and an elongated portion configured to support a blade portion of the key blank.

108. The key cutting machine of claim 107, wherein the upper clamp includes a bottom surface configured to press the shank portion of the key blank and an elongated portion configured to press the blade portion of the key blank.

109. The key cutting machine of claim 105, wherein the clamp mechanism further includes a block positioned above the top frame of the housing and a clamp screw extending through the top frame of the housing and connected to the block and the upper clamp.

110. The key cutting machine of claim 109, wherein the block is vertically movable between an open position away from the top frame of the housing and a closed position toward the top frame of the housing.

111. The key cutting machine of claim 110, wherein the clamp mechanism further includes a pair of springs biasing the block toward the closed position.

112. The key cutting machine of claim 111, wherein the block includes a hole extending therethrough and the clamp mechanism further includes a shaft and a cam eccentrically mounted on the shaft in the hole of the block to move the block between the open and closed positions.

113. The key cutting machine of claim 112, wherein the block is movable between the open and closed positions for every 180° rotation of the shaft.

114. The key cutting machine of claim 113, wherein the clamp mechanism further includes a pair of position switches spaced apart from each other by 180° and the shaft includes a projection engageable with the position switches for every 180° rotation of the shaft.

115. The key cutting machine of claim 97, further comprising a tip stop mechanism positioned behind the clamp mechanism and configured to engage and position the key blank longitudinally.

* * * * *